(12) United States Patent
Simmons et al.

(10) Patent No.: US 11,421,694 B2
(45) Date of Patent: Aug. 23, 2022

(54) PUMP HAVING MAGNETS FOR JOURNALING AND MAGNETICALLY AXIALLY POSITIONING ROTOR THEREOF, AND RELATED METHODS

(71) Applicant: White Knight Fluid Handling Inc., Kamas, UT (US)

(72) Inventors: Tom Simmons, Kamas, UT (US); Geoffrey White, Heber, UT (US); Courtney Parsons, Taylorsville, UT (US)

(73) Assignee: White Knight Fluid Handling Inc., Kamas, UT (US)

( * ) Notice: Subject to any disclaimer, the term of this patent is extended or adjusted under 35 U.S.C. 154(b) by 0 days.

(21) Appl. No.: 16/779,944

(22) Filed: Feb. 3, 2020

(65) Prior Publication Data

US 2020/0248696 A1 Aug. 6, 2020

Related U.S. Application Data

(60) Provisional application No. 62/800,264, filed on Feb. 1, 2019.

(51) Int. Cl.
| | |
|---|---|
| *F04D 13/06* | (2006.01) |
| *F04D 29/051* | (2006.01) |
| *F04D 29/058* | (2006.01) |
| *F04D 25/02* | (2006.01) |
| *F04D 13/02* | (2006.01) |

(Continued)

(52) U.S. Cl.
CPC ............. *F04D 13/06* (2013.01); *A61M 60/82* (2021.01); *F04D 13/024* (2013.01);
(Continued)

(58) Field of Classification Search
CPC .... F04D 13/024; F04D 13/026; F04D 13/027; F04D 13/0606; F04D 13/0633;
(Continued)

(56) References Cited

U.S. PATENT DOCUMENTS

| | | | | |
|---|---|---|---|---|
| 4,043,614 A | | 8/1977 | Lyman | |
| 4,057,369 A | * | 11/1977 | Isenberg | ............... F04D 19/048 417/365 |

(Continued)

FOREIGN PATENT DOCUMENTS

| | | |
|---|---|---|
| CN | 102549269 B | 12/2014 |
| DE | 0945183 C1 | 7/1956 |

(Continued)

OTHER PUBLICATIONS

European Extended Search Report and Opinion for European Application No. 20154520.9, dated Jun. 11, 2020, 75 pages.

(Continued)

*Primary Examiner* — Christopher S Bobish
(74) *Attorney, Agent, or Firm* — TraskBritt

(57) ABSTRACT

A pump may include a stator, a rotor, and an impeller. The stator may include one or more electromagnets and one or more permanent magnets. The rotor may include an armature, one or more complementary permanent magnets, and a pull magnet configured to position the rotor in an axial direction. The rotor may be disposed within the stator. The complementary permanent magnets and the one or more permanent magnets of the stator may create magnetic bearings. The armature may be aligned with at least one of the electromagnets of the stator and configured to rotate the rotor with respect to the stator. The impeller may be coupled to the rotor.

16 Claims, 10 Drawing Sheets

(51) Int. Cl.
  *H02K 7/09* (2006.01)
  *A61M 60/82* (2021.01)
  *F16C 32/04* (2006.01)
(52) U.S. Cl.
  CPC ......... *F04D 13/026* (2013.01); *F04D 13/027* (2013.01); *F04D 13/064* (2013.01); *F04D 13/0606* (2013.01); *F04D 13/0633* (2013.01); *F04D 25/026* (2013.01); *F04D 29/051* (2013.01); *F04D 29/058* (2013.01); *H02K 7/09* (2013.01); *F16C 32/041* (2013.01); *F16C 32/0408* (2013.01); *F16C 32/0412* (2013.01); *F16C 32/0417* (2013.01); *F16C 32/0421* (2013.01)
(58) Field of Classification Search
  CPC .... F04D 13/064; F04D 25/026; F04D 29/048; F04D 29/058; F04D 29/041; F04D 29/051; A61M 60/82; F16C 32/0408; F16C 32/0412; F16C 32/0417; F16C 32/041; F16C 32/0421; H02K 7/09
  See application file for complete search history.

(56) References Cited

U.S. PATENT DOCUMENTS

| | | | |
|---|---|---|---|
| 4,668,885 A | 5/1987 | Scheller | |
| 4,779,614 A | 10/1988 | Moise | |
| 5,112,200 A | 5/1992 | Isaacson et al. | |
| 5,385,581 A | 1/1995 | Bramm et al. | |
| 5,470,208 A | 11/1995 | Kletschka | |
| 5,484,266 A | 1/1996 | Murga | |
| 5,507,629 A | 4/1996 | Jarvik | |
| 6,053,705 A | 4/2000 | Schoeb et al. | |
| 6,100,618 A | 8/2000 | Schoeb et al. | |
| 6,171,078 B1 | 1/2001 | Schoeb | |
| 6,220,832 B1 | 4/2001 | Schoeb | |
| 6,222,290 B1 | 4/2001 | Schoeb et al. | |
| 6,249,067 B1 | 6/2001 | Schob et al. | |
| 6,278,251 B1 | 8/2001 | Schoeb | |
| 6,297,574 B1 | 10/2001 | Schoeb et al. | |
| 6,350,109 B1* | 2/2002 | Brunet | F04D 29/0465 417/365 |
| 6,351,048 B1 | 2/2002 | Schob et al. | |
| 6,355,998 B1 | 3/2002 | Schoeb et al. | |
| 6,386,505 B2 | 5/2002 | Schoeb | |
| 6,447,266 B2* | 9/2002 | Antaki | F04D 29/048 417/356 |
| 6,485,531 B1 | 11/2002 | Schoeb | |
| 6,559,567 B2 | 5/2003 | Schoeb | |
| 6,632,658 B1 | 10/2003 | Schoeb | |
| 6,634,224 B1 | 10/2003 | Schoeb et al. | |
| 6,637,433 B2 | 10/2003 | Schoeb | |
| 6,640,617 B2 | 11/2003 | Schoeb et al. | |
| 6,670,169 B1 | 12/2003 | Schoeb et al. | |
| 6,676,383 B2 | 1/2004 | Schoeb | |
| 6,711,943 B1 | 3/2004 | Schoeb | |
| 6,733,171 B2 | 5/2004 | Schoeb | |
| 6,742,999 B1* | 6/2004 | Nusser | F04D 29/048 417/423.1 |
| 6,864,084 B2 | 3/2005 | Schoeb | |
| 6,879,074 B2 | 4/2005 | Amrhein et al. | |
| 6,898,984 B2 | 5/2005 | Schoeb | |
| 7,112,903 B1 | 9/2006 | Schob | |
| 7,229,258 B2* | 6/2007 | Wood | A61M 60/148 417/355 |
| 7,357,858 B2 | 4/2008 | Schoeb | |
| 7,485,261 B2 | 2/2009 | Monzyk et al. | |
| 7,718,144 B2 | 5/2010 | Monzyk et al. | |
| 7,832,922 B2 | 11/2010 | Schoeb | |
| 7,914,479 B2 | 3/2011 | Monzyk et al. | |
| 8,092,074 B2 | 1/2012 | Hahn et al. | |
| 8,118,723 B2 | 2/2012 | Richardson et al. | |
| 8,177,703 B2 | 5/2012 | Smith et al. | |
| 8,349,172 B2 | 1/2013 | Schoeb | |
| 8,496,874 B2 | 7/2013 | Gellman et al. | |
| 8,581,462 B2 | 11/2013 | Nussbaumer | |
| 8,591,538 B2 | 11/2013 | Gellman | |
| 8,591,539 B2 | 11/2013 | Gellman | |
| 8,631,680 B2 | 1/2014 | Fleischli et al. | |
| 8,729,758 B2 | 5/2014 | Nussbaumer | |
| 8,826,746 B2 | 9/2014 | Haefliger et al. | |
| 9,000,636 B2 | 4/2015 | Nussbaumer | |
| 9,093,871 B2* | 7/2015 | Artinian | H02K 5/124 |
| 9,115,725 B2 | 8/2015 | Haefliger et al. | |
| 9,278,168 B2 | 3/2016 | Gellman et al. | |
| 9,314,557 B2* | 4/2016 | Ricci | A61M 60/422 |
| 9,835,158 B2 | 12/2017 | Schob | |
| 10,415,857 B2* | 9/2019 | Ueda | F25B 11/02 |
| 10,630,139 B2* | 4/2020 | Biddick | E21B 4/02 |
| 2001/0019117 A1 | 9/2001 | Schoeb | |
| 2002/0000228 A1 | 1/2002 | Schoeb | |
| 2002/0037580 A1 | 3/2002 | Schoeb | |
| 2003/0033859 A1 | 2/2003 | Schoeb et al. | |
| 2003/0035730 A1 | 2/2003 | Schob | |
| 2003/0053371 A1 | 3/2003 | Schoeb | |
| 2003/0074062 A1 | 4/2003 | Monzyk et al. | |
| 2003/0103852 A1 | 6/2003 | Schob | |
| 2004/0226871 A1 | 11/2004 | Schob | |
| 2005/0025680 A1 | 2/2005 | Monzyk et al. | |
| 2005/0029121 A1 | 2/2005 | Monzyk et al. | |
| 2007/0193635 A1 | 8/2007 | Hahn et al. | |
| 2007/0197855 A1 | 8/2007 | Richardson et al. | |
| 2007/0197856 A1 | 8/2007 | Gellman et al. | |
| 2007/0233041 A1 | 10/2007 | Gellman | |
| 2007/0233172 A1 | 10/2007 | Gellman | |
| 2007/0278987 A1 | 12/2007 | Bartholet et al. | |
| 2008/0017037 A1 | 1/2008 | Monzyk et al. | |
| 2008/0190870 A1 | 8/2008 | Schoeb | |
| 2008/0199357 A1 | 8/2008 | Gellman et al. | |
| 2008/0286441 A1 | 11/2008 | Chang et al. | |
| 2009/0074611 A1 | 3/2009 | Monzyk et al. | |
| 2011/0002794 A1 | 1/2011 | Haefliger et al. | |
| 2011/0025154 A1 | 2/2011 | Nussbaumer | |
| 2011/0031836 A1 | 2/2011 | Nussbaumer | |
| 2011/0038760 A1 | 2/2011 | Monzyk et al. | |
| 2011/0187217 A1 | 8/2011 | Nussbaumer | |
| 2011/0190683 A1 | 8/2011 | Gellman et al. | |
| 2011/0240220 A1 | 10/2011 | Schoeb | |
| 2013/0022481 A1 | 1/2013 | Schoeb et al. | |
| 2013/0164161 A1 | 6/2013 | Schoeb | |
| 2013/0330219 A1* | 12/2013 | LaRose | F04D 29/041 417/420 |
| 2013/0343927 A1 | 12/2013 | Ramdane et al. | |
| 2014/0023534 A1* | 1/2014 | Ramdane | F16C 32/0495 417/420 |
| 2014/0037500 A1 | 2/2014 | Gellman et al. | |
| 2014/0062239 A1 | 3/2014 | Schoeb | |
| 2016/0061210 A1* | 3/2016 | Hasegawa | F04D 29/058 62/498 |
| 2017/0012491 A1 | 1/2017 | Schob et al. | |
| 2017/0302145 A1 | 10/2017 | Holenstein et al. | |
| 2018/0051699 A1 | 2/2018 | Schoeb | |
| 2020/0292293 A1* | 9/2020 | Sakawaki | F04D 17/10 |
| 2020/0318883 A1* | 10/2020 | Nakajima | F16C 32/047 |
| 2020/0368415 A1* | 11/2020 | Antaki | F16C 32/0425 |
| 2021/0010536 A1* | 1/2021 | Yamasuso | F16C 32/0491 |
| 2021/0010719 A1* | 1/2021 | Hasegawa | F25B 49/022 |

FOREIGN PATENT DOCUMENTS

| | | | |
|---|---|---|---|
| DE | 2406790 A1 | 8/1975 | |
| DE | 59610178 | 4/2003 | |
| EP | 0130541 A1 | 1/1985 | |
| EP | 0467234 A2 | 1/1992 | |
| EP | 1479426 A1 | 11/2004 | |
| EP | 1013294 B1 | 4/2007 | |
| EP | 1825872 A2 | 8/2007 | |
| EP | 1825873 A3 | 9/2007 | |
| EP | 1063753 B1 | 7/2009 | |
| EP | 2274819 A1 | 1/2011 | |
| EP | 2357374 A1 | 8/2011 | |
| EP | 2290049 B1 | 8/2012 | |

(56) References Cited

FOREIGN PATENT DOCUMENTS

| | | | |
|---|---|---|---|
| EP | 2549113 A2 | 1/2013 | |
| EP | 2612036 A1 | 7/2013 | |
| EP | 2749780 A1 | 7/2014 | |
| EP | 2966305 A1 | 1/2016 | |
| EP | 2966305 A4 * | 3/2016 | ........... F04D 29/051 |
| EP | 3115616 A1 | 1/2017 | |
| EP | 3232549 A1 | 10/2017 | |
| EP | 2709688 B1 | 1/2018 | |
| FR | 2681384 A1 | 3/1993 | |
| JP | 59-113316 A | 6/1984 | |
| JP | 8159075 A | 6/1996 | |
| JP | 11-303788 A | 11/1999 | |
| JP | 2004-346925 A | 12/2004 | |
| JP | 2006-002614 A | 1/2006 | |
| KR | 10-2011-0044416 A | 4/2011 | |
| KR | 10-2013-0011940 A | 1/2013 | |
| TW | I389425 B1 | 3/2011 | |
| WO | 96/31934 A1 | 10/1996 | |
| WO | 97/15978 A1 | 5/1997 | |
| WO | 2009/132707 A1 | 11/2009 | |
| WO | 2011/049279 A1 | 4/2011 | |
| WO | 2011/097229 A2 | 8/2011 | |
| WO | 2012/028181 A1 | 3/2012 | |
| WO | 2012/159966 A1 | 11/2012 | |

OTHER PUBLICATIONS

Korean Notice of Preliminary Rejection for Korean Application No. 10-2020-0010769, dated Jan. 13, 2021, 8 pages with English translation.

Taiwanese Search Report and Office Action from Taiwanese Application No. 109102954, dated Oct. 27, 2020, 16 pages (w/English Tranlation).

Japanese Notice of Reasons for Refusal for Japanese Application No. 2020-010768, dated May 12, 2021, 12 pages with English translation.

International Search Report for International Application No. PCT/CH1996/000335, dated May 9, 1997, 09 pages.

Korean Notice of Final Rejection for Korean Application No. 10-2020-0010769, dated Jul. 28, 2021, 7 pages with English translation.

Korean Notice of Second Final Rejection for Korean Application No. 10-2020-0010769, dated Sep. 30, 2021, 5 pages with English translation.

Chinese First Office Action for Chinese Application No. 202010079059.X, dated Dec. 28, 2021, 11 pages with translation.

Japanese Notice of Reasons for Refusal for Japanese Application No. 2020-010768, dated Jan. 5, 2022, 6 pages with English translation.

Korean Notice of Reasons for Rejection for Korean Application No. 10-2021-0190966, dated Jan. 17, 2022, 9 pages with English translation.

Taiwanese Search Report from Taiwanese Application No. 110118451, dated Dec. 23, 2021, 2 pages with English Translation.

European Communication pursuant to Article 94(3) EPC for European Application No. 20154520.9, dated May 19, 2022, 5 pages.

Chinese Second Office Action for Chinese Application No. 202010079059.X, dated Jun. 2, 2022, 18 pages with translation.

* cited by examiner

PUMP HAVING MAGNETS FOR JOURNALING AND MAGNETICALLY AXIALLY POSITIONING ROTOR THEREOF, AND RELATED METHODS

CROSS-REFERENCE TO RELATED APPLICATION

This application claims the benefit under 35 U.S.C. § 119(e) of U.S. Provisional Patent Application Ser. No. 62/800,264, filed Feb. 1, 2019, the disclosure of which is hereby incorporated herein in its entirety by this reference.

TECHNICAL FIELD

The present disclosure relates generally to pumps for pumping liquids that include bearingless electromagnetic motors having a rotor and a stator, and in which magnets are used for journaling of the rotor within the stator, and to related methods of manufacturing and using such pumps.

BACKGROUND

Bearingless pumps generally include an impeller that is journaled by magnetic forces in a sealed pump housing. The pumps are generally driven by a rotating magnetic field generated by electromagnets carried by a stator within the pump housing. Such pumps are "bearingless" in the sense that they do not include conventional mechanical bearings, although magnets are used in to perform the journaling of the impeller (or rotor) within the stator. Bearingless pumps may be advantageous for applications in which the fluid to be conveyed must remain pure (e.g., not contaminated), for example, biological fluids (e.g., blood), or pure liquids (e.g., ultrapure water).

Bearingless pumps are also useful for conveying aggressive liquids (e.g., alkaline fluids, acidic fluids, caustic fluids, abrasive fluids, etc.) that would otherwise destroy or degrade mechanical bearings. Therefore, bearingless pumps are preferred for use in applications such as chemical-mechanical polishing, water treatment, processing operations, etc.

BRIEF SUMMARY

Various embodiments may include a pump including a stator, a rotor, and an impeller. The stator may include a drive magnet and one or more permanent magnets positioned on opposing axial ends of the drive magnet. The stator may also include at least one axial positioning magnet positioned at a first axial end of the stator. The rotor may be disposed coaxially within the stator. The rotor may include an armature aligned with the drive magnet and one or more complementary permanent magnets aligned with the one or more permanent magnets. The rotor may also include a push/pull magnet positioned at a first axial end of the rotor. The one or more complementary permanent magnets of the rotor and the one or more permanent magnets of the stator may be configured to create one or more magnetic bearings. The pull magnet may be configured to interact with the at least one axial positioning magnet to position the rotor in an axial direction relative to the stator. The armature and the drive magnet may be configured to rotate the rotor with respect to the stator. The impeller may be coupled to the rotor at a second axial end of the rotor opposite the first axial end. The impeller may be configured to rotate with the rotor.

Another embodiment of the present disclosure may be a pump assembly including an electric motor and an impeller. The electric motor may include a rotor, at least two magnetic bearings, and a positioning magnet assembly. The rotor may be configured to rotate relative to a stator. A drive magnet in the stator may be configured to impart a rotational force on a permanent magnet in the rotor. The at least two magnetic bearings may be positioned on opposing ends of the drive magnet in the stator. The at least two magnetic bearings may include at least two complementary permanent magnets. The at least two complementary permanent magnets may include a rotating permanent magnet and a stationary permanent magnet. The rotating permanent magnet may be attached to the rotor on opposing ends of the rotor and the stationary permanent magnets may be attached to the stator on opposing ends of the drive magnet. The positioning magnet assembly may be in a first longitudinal end of the electric motor. The positioning magnet assembly may include an electromagnetic axial positioning magnet coupled to the stator and a permanent push/pull magnet coupled to the rotor. The electromagnetic axial positioning magnet may be configured to interact with the permanent push/pull magnet to generate a force on the rotor in a direction along a longitudinal axis of the electric motor. The impeller may be coupled to the rotor on a longitudinal end of the rotor opposite the first longitudinal end of the electric motor.

Another embodiment of the present disclosure may be a method of controlling a rotor position in a magnetically levitated pump. The method may include sensing an axial position of a rotor relative to a stator with a position sensor. The method may further include outputting a voltage to a locating electromagnet positioned on an axial end of the rotor to position of the rotor at a position set-point. The method may also include sensing a current at a locating electromagnet. The method may further include comparing the current to a current set-point. The difference between the current and the current set-point may then be produced. The method may also include outputting an adjustment to the position set-point to correct the difference.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

The illustrations presented herein are not meant to be actual views of any particular pump or component thereof, but are merely idealized representations employed to describe illustrative embodiments of the present disclosure. The drawings are not necessarily to scale. Elements common between figures may retain the same numerical designation.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even 100% met.

As used herein, the term "magnetic material" means and includes ferromagnetic materials, ferrimagnetic materials, antiferromagnetic, and paramagnetic materials.

Bearingless pumps (e.g., magnetically levitated pumps, etc.) may provide multiple advantages. The removal of traditional bearings may result in reduced frictional losses due to friction inherent in typical bearing and seal combinations. The removal of traditional bearings may also increase the operating time (e.g., lifespan) of pump components before the pump must be rebuilt or replaced due to worn parts. Removing the traditional bearings also introduces additional variables into the bearingless pump that are traditionally remedied by the traditional bearings. For example, traditional bearings may locate the rotating portion of the pump (e.g., shaft, impeller, rotor, etc.) both radially (e.g., about a central axis) and longitudinally (e.g., axially, laterally, along the central axis). Magnetic bearings may also locate the rotating portion of the pump both axially and longitudinally; however, the magnetic bearings may allow the rotating portion of the pump to move (e.g., shift, slip, displace, etc.) by larger distances than a traditional mechanical bearing. In some applications, the additional movement may be undesirable and/or may result in additional wear, damaged parts, and other potential problems.

Figure 1:
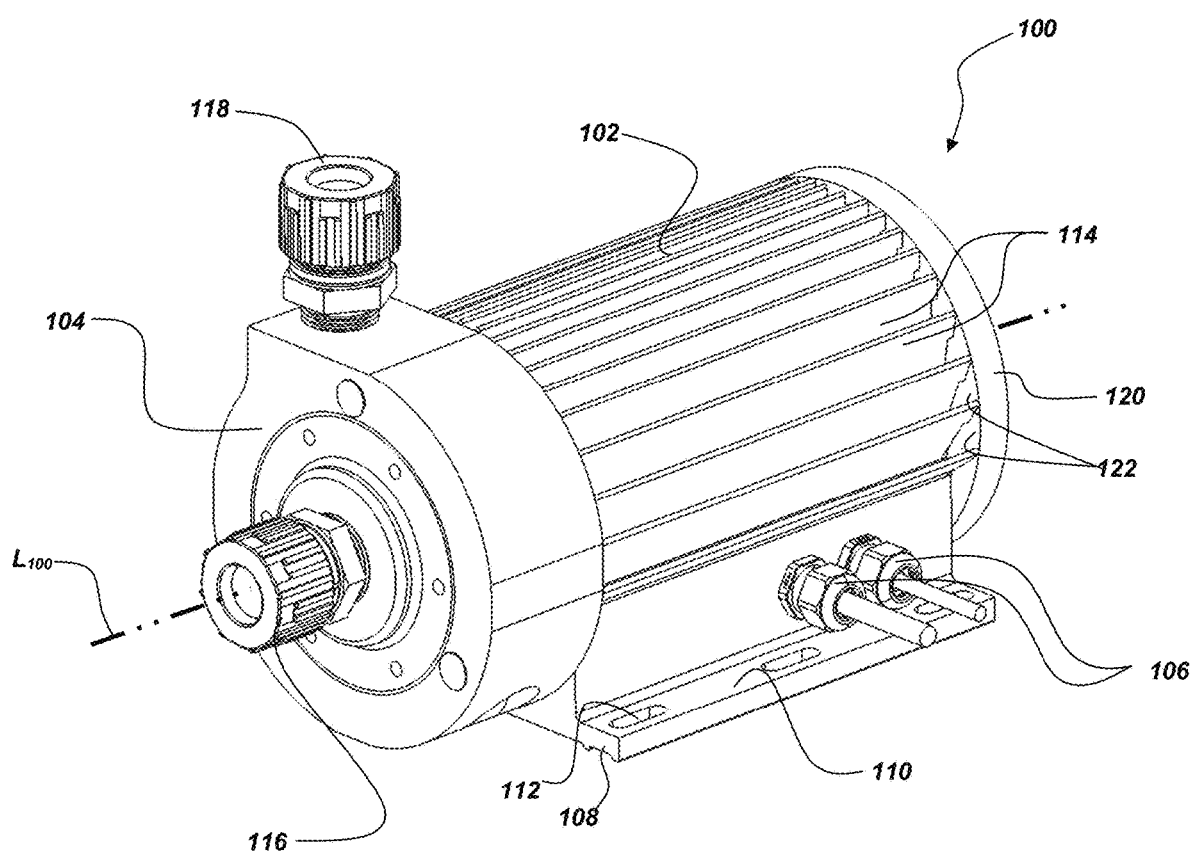
FIG. 1 is an isometric view of a pump according to an embodiment of the present disclosure.

FIG. 1 illustrates an embodiment of a pump 100 according to the present disclosure. The pump 100 may include a body 102 and a pump housing 104. The body 102 may include a motor (e.g., a D.C. motor, an A.C. motor, etc.) and/or drive components for the pump 100. The body 102 may include ports 106 that enable power and/or electrical signals (e.g., electricity) to be conveyed from an external power source and/or controller/drive to the motor within the body 102. The body 102 may include a mounting structure 108.

The mounting structure 108 may be used to secure the pump 100 to a stationary object (e.g., wall, floor, mounting pad, structure, frame, etc.). In some embodiments, the mounting structure 108 may include a flange 110 having at least one hole 112 (e.g., slot, opening, etc.) extending therethrough. The hole 112 may be configured to receive mounting hardware such as bolts, studs, screws, straps (e.g., metal straps, polymer straps, cloth straps, nylon straps, band straps, clamping straps, etc.), cables, brackets, hooks, etc. In some embodiments, the mounting structure 108 may include integral mounting hardware (e.g., studs, clamps, threaded inserts, etc.).

The body 102 may also include one or more fins 114 (e.g., protrusions, plates, etc.) extending from the body 102. In some embodiments, the fins 114 may be configured to aid in transferring heat from the motor (e.g., cooling the motor) or other components inside the body 102. The fins 114 may be linear (e.g., substantially straight) and extend radially outward from the body 102, and may be oriented parallel to a longitudinal axis of the body 102, as shown in FIG. 1. In some embodiments, the fins 114 may be substantially circular (e.g., annular, etc.) extending circumferentially about a central axis $L_{100}$ (e.g., in a series of rings, spiral, helix, etc.).

The pump housing 104 may include a back plate 120. The back plate 120 may include one or more cooling ports 122. The cooling ports 122 may be configured to direct fluid (e.g., air, water, etc.) flow over the fins 114. In some embodiments, the cooling ports 122 may be configured to direct passive fluid flow. In some embodiments, an auxiliary device such as a fan or pump may be coupled to the back plate 120 and configured to force fluid flow through the cooling ports 122 and over the fins 114. For example, the auxiliary device may be configured to draw fluid through the cooling ports 122 such that the fluid may flow over the fins 114 and then be drawn through the cooling ports 122 by the auxiliary device. In some embodiments, the auxiliary device may be configured to force fluid through the cooling ports 122 and then over the fins 114.

The pump housing 104 may include an inlet port 116 and an outlet port 118. The pump housing 104 may house an impeller (e.g., rotor, paddle, propeller, turbine, etc.) configured to receive a fluid through the inlet port 116 and output the fluid through the outlet port 118. In some embodiments, the impeller may be configured to pressurize the fluid to a higher pressure than the fluid at the inlet port 116 before outputting the fluid through the outlet port 118 (e.g., a pump). In other embodiments, the impeller may be configured to receive the fluid at a high pressure through the inlet port 116 and output the fluid at a lower pressure through the outlet port 118. The high pressure fluid may cause the impeller to rotate converting the pressure of the fluid into rotational energy which may then be converted into, electrical energy or some other form of mechanical energy.

Figure 2:
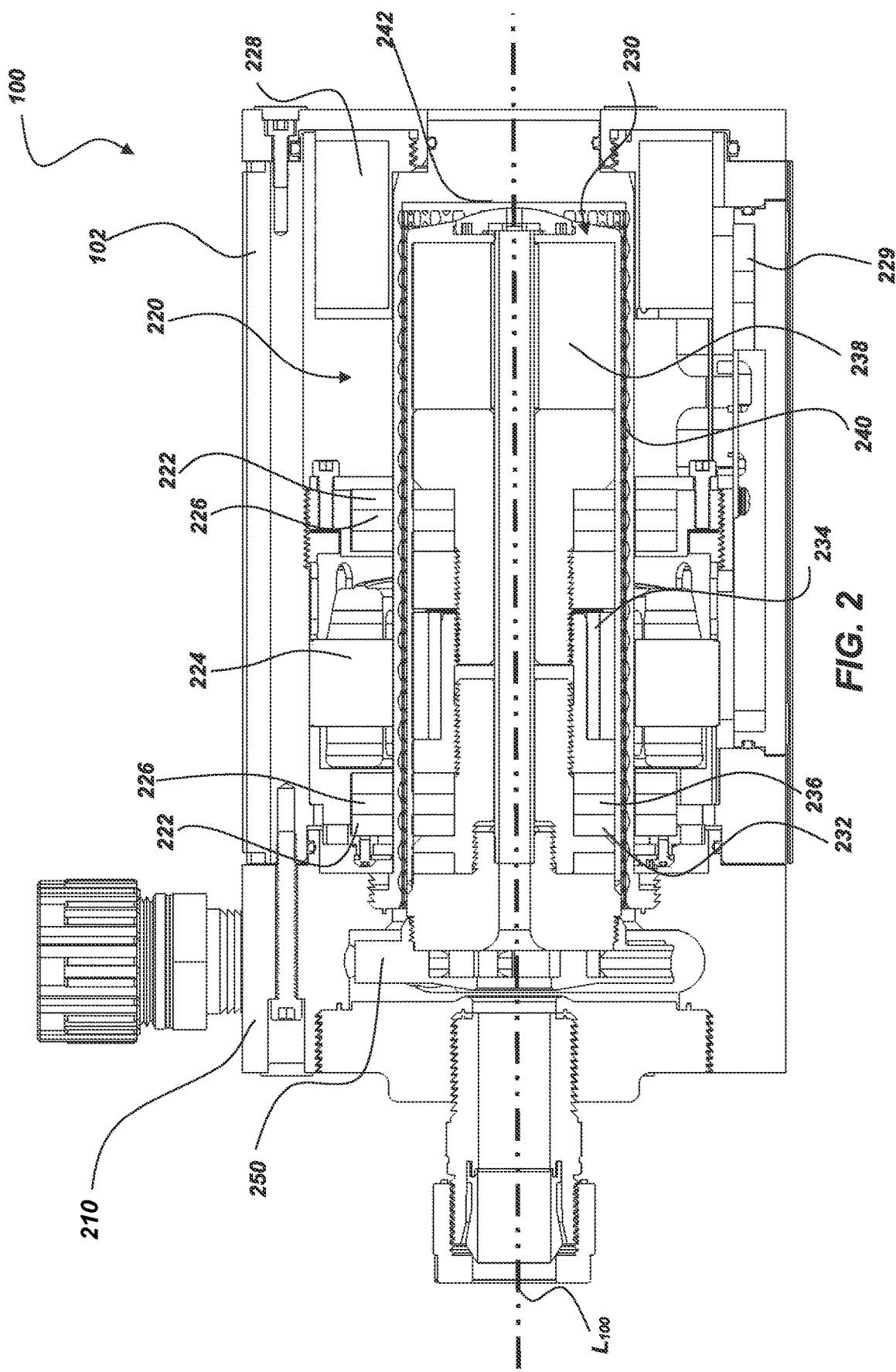
FIG. 2 is a cross-sectional view of the pump illustrated in FIG. 1.

FIG. 2 illustrates a cross-sectional view of the pump 100. The body 102 may enclose a stator assembly 220, pump housing assembly 210, and a rotor assembly 230. The stator assembly 220 may include one or more permanent magnets 222 and one or more drive magnets 224. The drive magnets 224 may be, for example, electromagnets, windings, a commutator, a coil, an armature, etc., configured to generate a magnetic field around the rotor assembly 230. The one or more permanent magnets 222 may be substantially annular (e.g., ring shaped, circular, etc.). The permanent magnets 222 may rest against spacers 226 (e.g., shims, annular rings, etc.). The stator assembly 220 may further include a pull magnet 228 and a lift magnet 229. The pull magnet 228 and the lift magnet 229 may be configured to control or maintain a position of the rotor assembly 230 relative to the stator. In some embodiments, at least one of the pull magnet 228 and the lift magnet 229 may be an electromagnet. In some embodiments, at least one of the pull magnet 228 and the lift magnet 229 may be a permanent magnet.

The rotor assembly 230 may include one or more complementary permanent magnets 232, an armature 234, spacers 236, and a complementary pull magnet 238. The complementary permanent magnets 232 and the armature 234 may be substantially annular in shape. The armature 234 may be, for example, a coil, windings, a conductor, a permanent magnet, etc., configured to generate a rotational force on the rotor assembly 230 from the magnetic field generated by the drive magnets 224. The complementary permanent magnets 232 may be substantially aligned with the permanent magnets 222 of the stator assembly 220 in an axial direction, along a longitudinal axis $L_{100}$. The complementary pull magnet 238 may not be substantially aligned with the pull magnet 228 of the stator assembly 220 in the axial direction.

In some embodiments, the magnetic fields generated by the permanent magnets 222 and the complementary permanent magnets 232 may form passive bearings (e.g., magnetic bearings, contactless bearings, etc.). For example, the permanent magnets 222 and the complementary permanent magnets 232 may be configured to induce a repelling force between the permanent magnets 222 and the complementary permanent magnets 232. The repelling force may cause the rotor assembly 230 to float within the stator assembly 220, such that the rotor assembly 230 does not physically contact the stator assembly 220 at any point. Such contactless interaction may reduce frictional losses within the motor. Additionally, a pathway 240 (e.g., passage, path, etc.) may be created between the rotor assembly 230 and the stator assembly 220 such that fluid may pass therethrough. The fluid may be a lubricating fluid, a cooling fluid, a cleansing fluid, a flushing fluid, a blow-by fluid, or any other type of fluid.

In some embodiments, at least one of the permanent magnets 222 and the complementary permanent magnets 232 may be formed from a relatively high strength magnetic material. The high strength magnetic material may have a maximum energy product of at least about 5 MGOe, such as at least about 42 MGOe, at least about 52 MGOe, or combinations therebetween. In some embodiments, at least one of the permanent magnets 222 and the complementary permanent magnets 232 may be formed from a magnetic material such as, alnico (e.g., alloys of aluminum, nickel, and cobalt), neodymium alloys, or samarium cobalt alloys.

In some embodiments, the pull magnet 228 and the complementary pull magnet 238 may be configured to control the axial position of the rotor assembly 230 with respect to the stator assembly 220. For example, the pull magnet 228 may be configured to induce a force in the axial direction on the complementary pull magnet 238, as described in more detail below with respect to FIG. 4. The pull magnet 228 and the complementary pull magnet 238 may be controlled by an electronic controller. For example, a controller 260 may be housed within the stator assembly 220. In some embodiment, the electronic controller may be positioned externally (e.g., separate from the stator assembly 220).

An impeller 250 may be connected (e.g., attached, coupled, etc.) to the rotor assembly 230, such that any rotation of the rotor assembly 230 is imparted to the impeller 250 and/or any rotation of the impeller 250 is imparted to the rotor assembly 230. The impeller 250 may be connected to the rotor assembly 230 through a mechanical connection such as, bolts, studs, screws, keys, threads (e.g., pipe thread, straight threads, etc.). In some embodiments, the impeller 250 may be connected to the rotor assembly 230 with an adhesive (e.g., glue, epoxy, etc.) or a physiochemical process (e.g., soldering, welding, etc.). In some embodiments, the impeller 250 may be connected to the rotor assembly 230 through an interference connection (e.g., pressed fit, friction fit, etc.). In some embodiments, the impeller 250 may be connected to the rotor assembly 230 by a combination of elements or methods as described above.

In some embodiments, energy may be transferred between the armature 234 and the drive magnets 224 as the rotor assembly 230 rotates relative to the stator assembly 220. For example, electricity may be applied to the drive magnets 224 which may induce a rotational force on the armature 234. The rotational force may cause the rotor assembly 230 to rotate relative to the stator. In another embodiment, rotation of the impeller 250 may cause the rotor assembly 230 to rotate relative to the stator. As the armature 234 rotates relative to the drive magnets 224, the armature 234 may induce an electrical current in the drive magnets 224 generating electrical energy.

Figure 3:
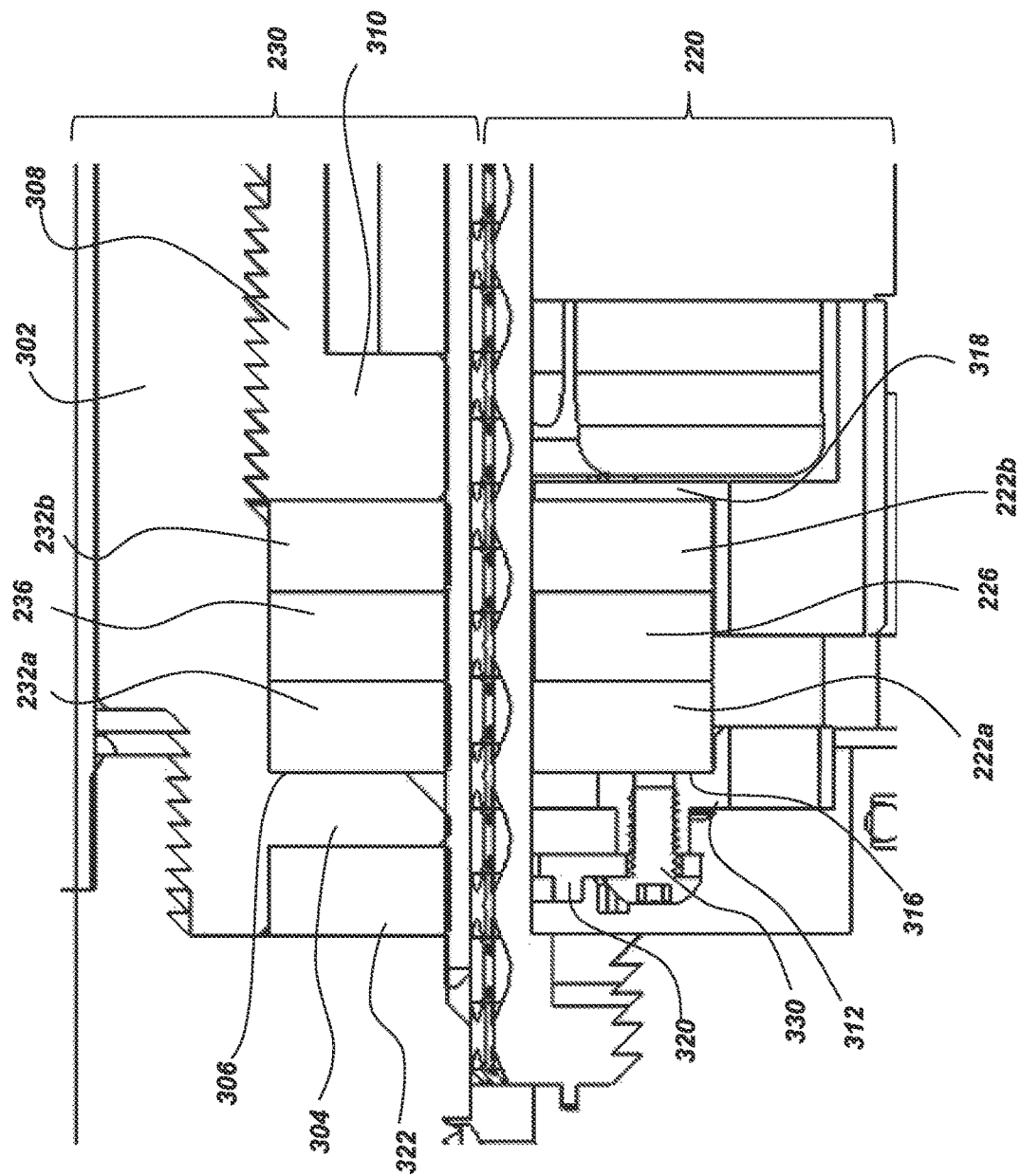
FIGS. 3 and 4 are enlarged views of portions of the cross-sectional view of the embodiment of the pump illustrated in FIG. 2.

FIG. 3 illustrates an enlarged view of the permanent magnet 222 and complementary permanent magnet 232 of the embodiment of the pump 100 in FIG. 2. The rotor assembly 230 may include multiple structural sections configured to retain and separate different parts of the rotor assembly 230. For example, the rotor assembly 230 may include a front support 302 with a front retaining structure 304 configured to retain the complementary permanent magnets 232 on a first axial end 306. A first complementary permanent magnet 232a may be positioned against the front retaining structure 304. The spacer 236 may be positioned between the first complementary permanent magnet 232a and a second complementary permanent magnet 232b. The second complementary permanent magnet 232b may be secured in place by an armature support 308. The armature support 308 may include front central spacer 310 configured to sandwich the first and second complementary permanent magnets 232a, 232b and the spacer 236 between the front retaining structure 304 and the front central spacer 310.

In some embodiments, the space between the front retaining structure 304 and the front central spacer 310 may be adjustable. For example, the armature support 308 may thread onto the front support 302. In some embodiments, the armature support 308 may be a collar with threads on an inner surface of the armature support 308 that are configured to interface with threads on an exterior surface of the front support 302. In some embodiments, the interfacing surfaces between the front support 302 and the armature support 308 may be relatively smooth, such that the armature support 308 is able to slide axially along the front support 302. The armature support 308 and the front support 302 may clamp the first and second complementary permanent magnets 232a, 232b, and the spacer 236 between the front retaining structure 304 and the front central spacer 310 with separate hardware (e.g., bolt, screw, stud, spring clamp, screw clamp, etc.).

The permanent magnets 222 in the stator assembly 220 may include a similar retaining structure. For example, the stator assembly 220 may include a front retaining element 312 configured to contact a leading end 316 of a first permanent magnet 222a and a secondary front retaining element 318 configured to sandwich a second permanent magnet 222b and the first permanent magnet 222a as well as the spacer 226 between the front retaining element 312 and the secondary front retaining element 318. In some embodiments, the front retaining element 312 and the secondary front retaining element 318 may be clamped together using a bolted connection. In other embodiments, the front retaining element 312 and the secondary front retaining element 318 may be clamped together with a threaded connection, or other connections similar to those outlined above with respect to the armature support 308 and the front support 302. In some embodiments, the front retaining element 312 and the secondary front retaining element 318 may be part of the stator assembly 220. In some embodiments, the front retaining element 312 and the secondary front retaining element 318 may be part of the body 102. In some embodiments, the front retaining element 312 and the secondary front retaining element 318 may be a combination of parts of the body 102 and parts of the stator assembly 220.

In some embodiments, a position sensor 320 may be positioned in the stator assembly 220 substantially aligned with a position indicator 322. In some embodiments, the position indicator 322 may be a permanent magnet. In some embodiments, the position indicator 322 may be another element configured to interact with the position sensor 320, such as a heated element, a reflective element, etc. The position sensor 320 may configured to produce a signal corresponding to an axial position of rotor assembly 230 in relation to stator assembly 220. In some embodiments, the sensor 320 may be a magnetic proximity sensor, a Hall Effect sensor, an ultrasonic sensor, an inductive sensor, a laser sensor, a photo sensor, a capacitive sensor, an infrared sensor, etc. In some embodiments, the controller 260 may monitor the signal from the position sensor 320. The controller 260 may control the axial position of the rotor assembly 230 by adjusting the power to the pull magnet 228 as described in detail below, to adjust the axial force on the rotor assembly 230.

The position sensor 320 may be coupled to the front retaining element 312 through a connection 330. In some embodiments, the connection 330 may be a bolted connection as shown in FIG. 3. In some embodiments, the connection 330 may be an adhesive connection, such as glue or epoxy. In some embodiments, the connection 330 may be a clamped connection, such as a spring clamp, a bolted clamp, etc.

In some embodiments, there may be more than one position sensor 320, such as between 1 sensor and 10 sensors, between 1 sensor and 5 sensors, or between 1 sensor and 3 sensors. In some embodiments, the controller 260 may monitor an average axial position from all of the sensors. For example, the controller 260 may receive individual readings from each sensor of the position sensors 320 and average the readings from the position sensors 320 internally. In some embodiments, the position sensors 320 may be wired into an averaging circuit, providing a single averaged input to the controller 260.

In some embodiments, the controller 260 may monitor the position sensors 320 individually and determine a minimum value, maximum value, average value, median value, etc. In some embodiments, the controller 260 may be configured to perform different operations with the different values. For example, the controller 260 may produce an alarm (e.g., audible alarm, alarm signal, dry contact alarm, safety circuit, etc.) when the maximum or minimum value from the position sensor 320 are above or below defined thresholds. In some embodiments, the threshold values may be defined in positions such that the alarms may stop operation of the pump 100 before damage occurs.

The controller 260 may be configured to control the axial position of the rotor assembly 230 to within about 0.5 mm, or even within about 0.25 mm.

Figure 4:
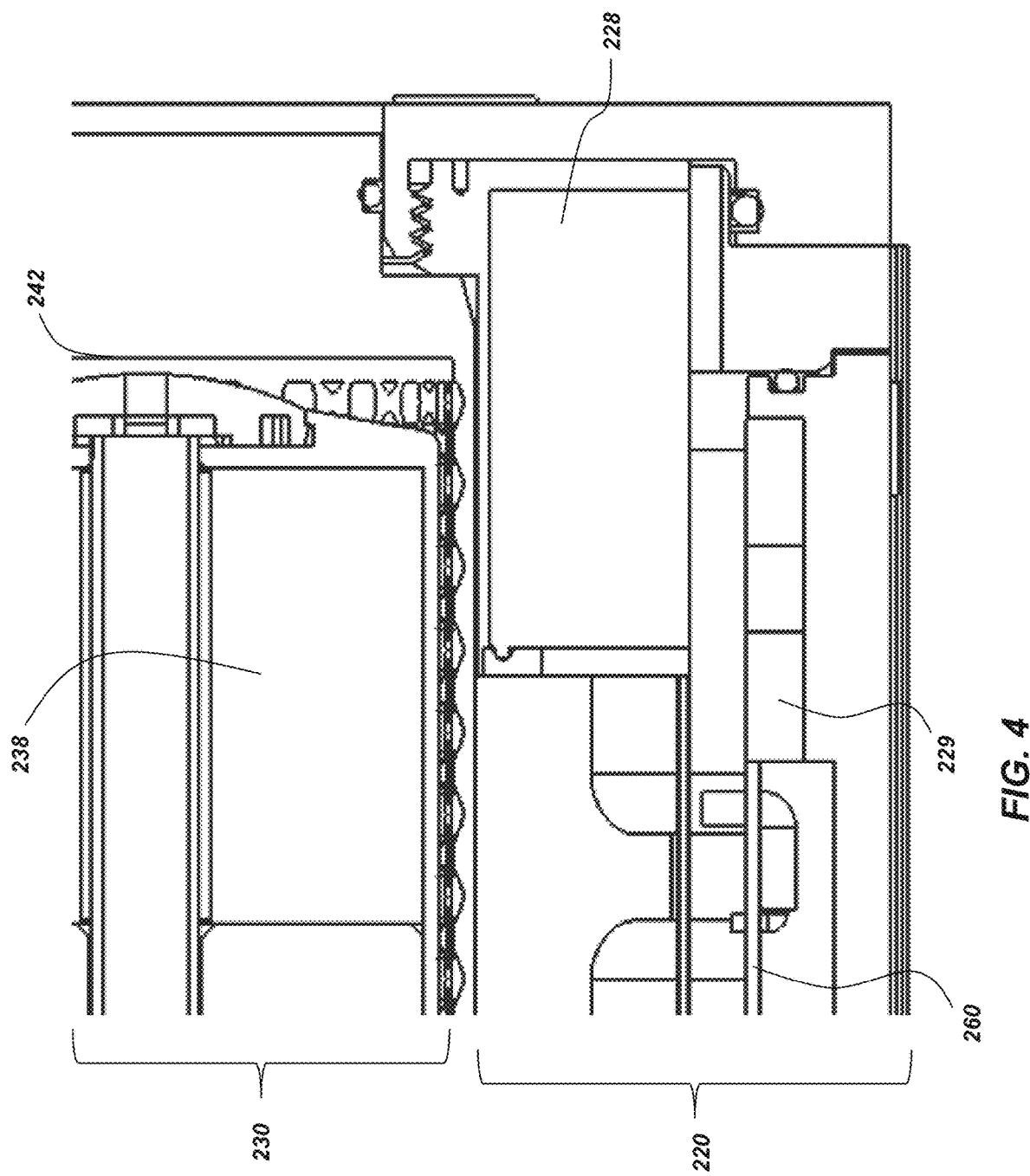

FIG. 4 illustrates an enlarged view of the pull magnet 228 and the complementary pull magnet 238 of the embodiment of the pump 100 shown in FIG. 2. The magnetic fields generated by the pull magnet 228 and the complementary pull magnet 238 may generate an axial force on the rotor assembly 230. The pull magnet 228 may be an electromagnet such that the axial force may be adjusted to maintain the rotor assembly 230 in a desired axial position. For example, the pull magnet 228 may generate an increased axial force toward pump housing surface 242 if the rotor assembly 230 and complementary pull magnet 238 move in an axial direction away from pump housing surface 242. Alternatively, the pull magnet 228 may decrease the axial force or even induce a repelling force pushing the complementary pull magnet 238 and rotor assembly 230 away from pump housing surface 242, if the rotor is too close or touching pump housing surface 242. In some embodiments, pump housing surface 242 may be a hard stop configured to maintain the axial position of the rotor assembly 230 within tolerances, such that damage to critical components of the rotor assembly 230, such as the impeller 250, is substantially prevented.

In some embodiments (e.g., when the pump 100 is installed with the axis of the stator in the vertical direction), lift magnet 229 will not be part of the assembly. In other embodiments (e.g., when the pump 100 is installed with the axis of the stator in the horizontal plane), lift magnet 229 may be a permanent magnet configured to repel the complementary pull magnet 238. The lift magnet 229 may be positioned at an end of the stator assembly 220 near complementary pull magnet 238. The lift magnet 229 may introduce a load on the rotor assembly 230. The load may increase as the complementary pull magnet 238 travels radially down in the direction of gravity and decrease as the complementary pull magnet 238 travels radially up in the direction of gravity.

In some embodiments, the amps required to turn the rotor assembly 230 may be monitored. For example, the pump 100 may include internal circuitry or controls that may monitor the amps at the drive magnets 224 (FIG. 2). For example, an internal circuit may isolate the wiring traveling to the drive magnets 224 from other electrical components in the pump 100. A sensor (e.g., current transducer, resistance sensor, fiber optic sensor, hall-effect sensor, etc.) may monitor the isolated circuit and the controls or internal circuitry may monitor the amps in the isolated circuit, record and log the amps in the isolated circuit, and/or control another component of the pump based on the amps in the isolated circuit. In some embodiments, some or all of the control may be located externally, such that a sensor may be positioned in or on the power input into the pump 100 and analyzed by an external controller. In some embodiments, the revolutions of rotor assembly 230 may be monitored.

In some embodiments, the axial position of the rotor assembly 230 may be controlled by increasing or decreasing the power to the pull magnet 228. For example, as rotor assembly moves axially away from its position set-point, the amps provided to pull magnet 228 may increase or decrease. The increase or decrease in power will change the pull magnets 228 interaction with the complementary pull magnet 238 and will alter the position of rotor assembly 230, moving rotor assembly 230 back to its position set-point.

The power to the pull magnet 228 may be controlled through a control algorithm such as a PID loop, step and wait algorithm, closed loop control, feed-forward control, etc. The control algorithm may include a position set-point and a current set-point for the amps going to the pull magnet 228.

For example, the control algorithm may monitor the position of the position indicator 322 compared to the position sensor 320 and compare the position to the position set-point. The control algorithm may then make appropriate adjustments to the power to the pull magnet 228 to correct any differences between the monitored position of the position indicator 322 and the position set-point. The control algorithm may then compare the amps going to the pull magnet 228 to the current set-point and adjust the position set-point accordingly based on a calculated difference between the actual amps and the current set-point. In some embodiments, the current set-point may be a set number that is anticipated to be the lowest power required to levitate the rotor assembly 230 in pump 100. For example, the current set-point may be between about 0 amps and about 12 amps, such as between about 5 amps and about 10 amps, or about 7 amps. In some embodiments, the control algorithm may minimize the power usage, making adjustments through a control loop until a minimum power usage is reached (e.g., such that any adjustment results in an increase in power usage).

In some embodiments, the axial position of the rotor assembly 230 may be controlled through a combination of monitoring the pull magnet 228 amps and the position sensor 320.

Figure 5:
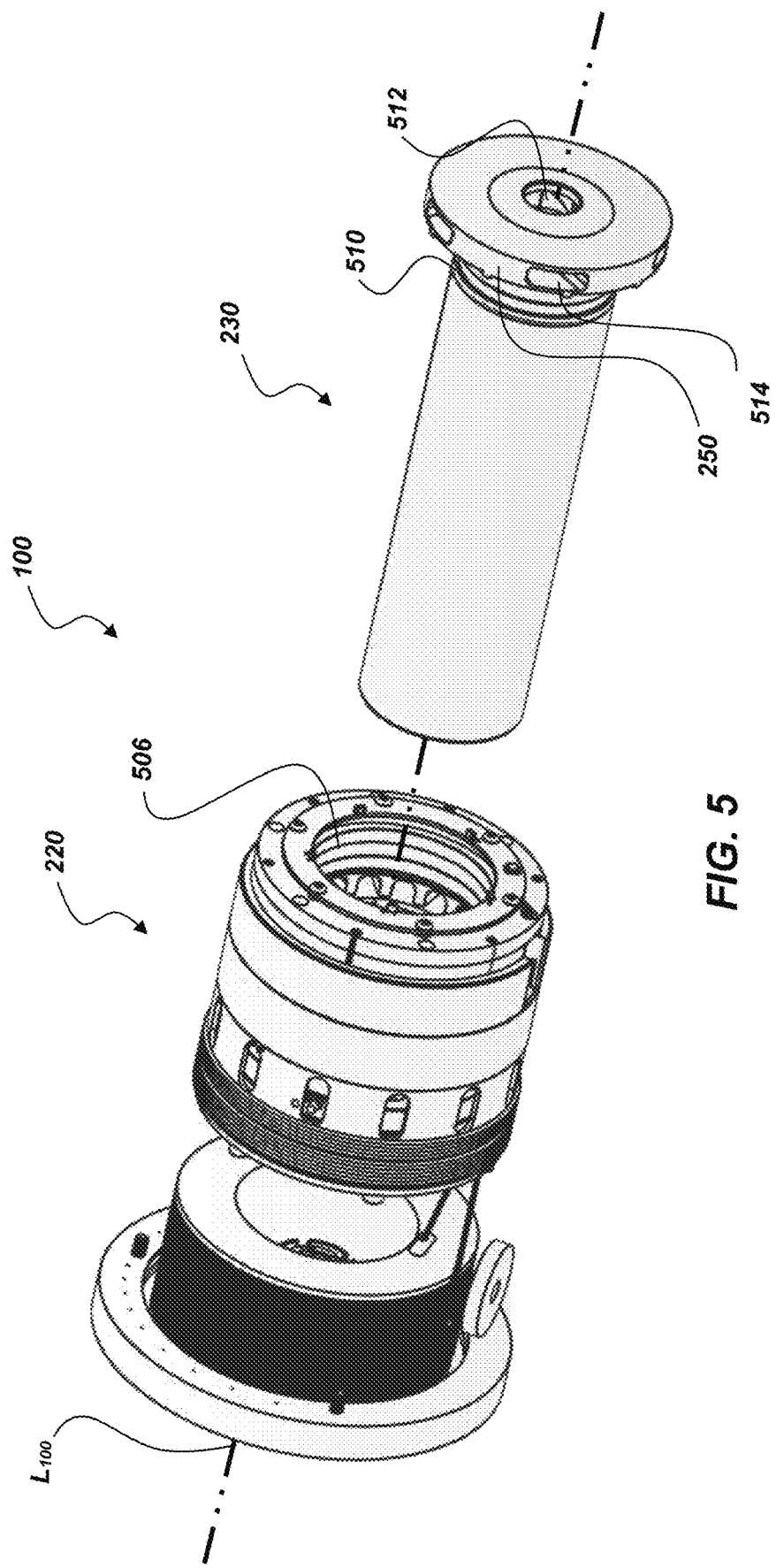
FIG. 5 is an exploded view of a stator and rotor assembly of the pump illustrated in FIGS. 1-4.

FIG. 5 illustrates an exploded view of the pump 100. The stator assembly 220 and rotor assembly 230 may be substantially coaxial about the axis $L_{100}$. The rotor assembly 230 may be configured to be at least partially disposed into a bore 506 defined by the stator assembly 220. An impeller 250 may be attached to the rotor assembly 230 at a first end 510 of the rotor assembly 230. The rotor assembly 230 may be configured to rotate within the bore 506 of the stator assembly 220. The impeller 250 may be configured to rotate with the rotor assembly 230. The impeller 250 may be configured to draw fluid in through an inlet 512 and output the fluid at a higher pressure through the vanes 514 (e.g., blades, flutes, etc.). In some embodiments, the vanes 514 may be configured to provide a relatively higher volume of flow at a lower pressure. In other embodiments, the vanes 514 may be configured to provide a relatively lower volume of flow at a higher pressure. The rotational speed of the rotor assembly 230 may also affect the flow volume and/or pressure of the fluid.

Figure 6:
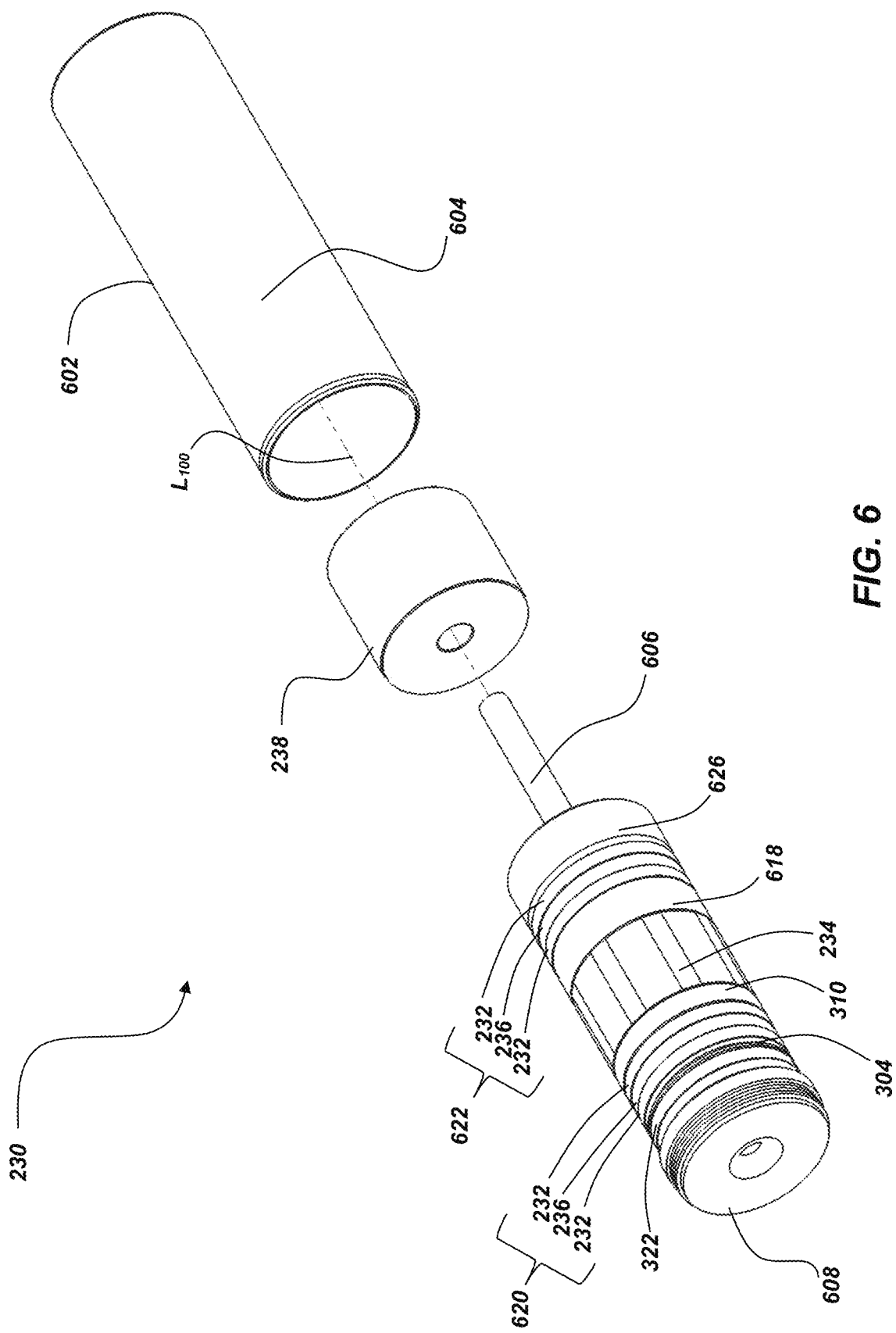
FIG. 6 is a partially exploded view of the rotor assembly illustrated in FIG. 5.

FIG. 6 illustrates a partially exploded view of the rotor assembly 230, which functions as a drive shaft for the impeller 250 (FIG. 2). The rotor assembly 230 may be encased within a shell 602. The shell 602 may also provide a surface over which a fluid (e.g., cooling fluid, lubricating fluid, flushing fluid, cleaning fluid, etc.) may flow without directly contacting internal components of the rotor assembly 230. In some embodiments, the shell 602 may be formed from a non-ferrous material such as, a polymer (e.g., polytetrafluoroethylene (PTFE), polyvinylchloride (PVC), etc.), a non-ferrous metal (e.g., aluminum, copper, stainless steel, etc.), etc. In some embodiments, the shell 602 may be formed from a corrosion resistant material (e.g., polymers, aluminum, etc.) or have a corrosion resistant coating (e.g., rubber coating, polymer coating, etc.).

In some embodiments, an outer surface 604 may be a smooth surface. In some embodiments, the outer surface 604 may include a pattern of raised or recessed features (e.g., dimples, ridges, vanes, grooves, fins, etc.).

The rotor assembly 230 may be concentrically assembled over a central shaft 606. In some embodiments, the central shaft 606 may be hollow. For example, the central shaft 606 may define an opening, passage, or pathway through a longitudinal length of the shaft 606. The fluid may flow through the central shaft. For example, the fluid may circulate around the outer surface 604 of the shell 602 and then through the central shaft 606 or the fluid may first pass through the central shaft 606 and then exit around the outer surface 604 of the shell 602.

The central shaft 606 may be connected (e.g., attached, coupled, etc.) to a front connecting element 608. In some embodiments, the central shaft 606 may be attached to the front connecting element 608 with hardware (e.g., screws, bolds, studs, rivets, pins, etc.). In some embodiments, the central shaft 606 may be attached to the front connecting element 608 with an adhesive (e.g., glue, epoxy, etc.), weld, or solder. In some embodiments, the central shaft 606 may be attached to the front connecting element 608 through an interference fit (e.g., press fit, friction fit, etc.). In some embodiments, the central shaft 606 may be formed as part of the front connecting element 608. For example, the central shaft 606 may be extruded or drawn from the front connecting element 608, or the front connecting element 608 and the central shaft 606 may be formed in a process such as forging or molding. In some embodiments, the central shaft 606 may be attached to the front connecting element 608 through a combination of several attachment means. In some embodiments, the shell 602 may be configured to connect to the front connecting element 608 by welding, gluing, a threaded connection, mechanical fasteners, etc.

The front connecting element 608 may be configured to attach the rotor assembly 230 to the impeller 250 (FIG. 5). In some embodiments, the front connecting element 608 may provide a threaded connection (e.g., pipe threads, machine threads, external threads, internal threads, etc.) for connecting to the impeller 250 (FIG. 5). In some embodiments, the front connecting element 608 may provide hardware (e.g., studs, pins, key stock, etc.) or hardware receiving features (e.g., holes, threaded holes, grooves, tracks, etc.) for connecting to the impeller 250 (FIG. 5). In some embodiments, the front connecting element 608 may provide a surface configured to be pressed into the impeller 250 (FIG. 5) (e.g., an interference fit). In some embodiments, the front connecting element 608 may be configured to attach to the impeller 250 (FIG. 5) through a combination of connecting features.

Following the front connecting element 608, the rotor assembly 230 may include a pattern of complementary permanent magnets 232 and spacers 236. The complementary permanent magnets 232 may be configured to interact with the corresponding permanent magnets 222 in the stator assembly 220 (FIGS. 2, 5, and 9) to form magnetic bearings. The spacers 236 may be configured to position the complementary permanent magnets 232 in the correct axial position and maintain the complementary permanent magnets 232 in position once the rotor assembly 230 is assembled. The spacers 236 may have different thicknesses at different locations to define the correct axial positions of the complementary permanent magnets 232. The complementary permanent magnets 232 and spacers 236 may be arranged to form a front magnetic bearing assembly 620 and a rear magnetic bearing assembly 622. Each of the front magnetic bearing assembly 620 and the rear magnetic bearing assembly 622 may include at least one complementary permanent magnet 232 and at least one spacer 236. In some embodiments, the front magnetic bearing assembly 620 may include at least two complementary permanent magnets 232 separated by at least one spacer 236. Similarly, the rear magnetic bearing assembly 622 may include at least two complementary permanent magnets 232 separated by at least one spacer 236. In another embodiment, at least one of the front magnetic bearing assembly 620 and the rear magnetic bearing assembly 622 may include at least three complementary permanent magnets 232 separated by at least two spacers 236. In some embodiments, the front magnetic bearing assembly 620 and/or rear magnetic bearing assembly 622 may include additional complementary permanent magnets 232, such as four, five, six, or more complementary permanent magnets 232. Similarly, the front magnetic bearing assembly 620 and/or rear magnetic bearing assembly 622 may include additional spacers 236, such as three, four, five, six, or more spacers 236.

In some embodiments, adjacent complementary permanent magnets 232 in one or more of the front magnetic bearing assembly 620 and the rear magnetic bearing assembly 622 may be oriented with opposing polarities such that the adjacent complementary permanent magnets 232 induce a repulsive force between the adjacent complementary permanent magnets 232 in the rotor assembly 230 pushing the complementary permanent magnets 232 against the front and/or rear central spacers 310, 618 and/or the front and/or rear retaining structure 304, 626. In some embodiments, adjacent complementary permanent magnets 232 in one or more of the front magnetic bearing assembly 620 and the rear magnetic bearing assembly 622 may be oriented with the same polarities such that the adjacent complementary permanent magnets 232 induce an attracting force between the adjacent complementary permanent magnets 232 in the rotor assembly 230 pulling the complementary permanent magnets 232 against the spacer 236 between the adjacent complementary permanent magnets 232.

The position indicator 322 may be positioned on an end of one of the front magnetic bearing assembly 620 and the rear magnetic bearing assembly 622. For example, the position indicator 322 may be positioned ahead of the front magnetic bearing assembly 620, between the front magnetic bearing assembly 620 and the front connecting element 608. The position indicator 322 may be configured to interact with the position sensor 320 in the stator assembly 220 (FIG. 3).

The armature 234 may be disposed between two central spacers 310, 618. The front central spacer 310 may be positioned between the armature 234 and the front magnetic bearing assembly 620. A rear central spacer 618 may be positioned between the armature 234 and the rear magnetic bearing assembly 622. The assembly of front and rear magnetic bearing assemblies 620, 622, central spacers 310, 618, and the armature 234 may be secured between the front retaining structure 304 and a rear retaining structure 626.

The armature 234 may be configured to convert magnetic impulses provided by the stator assembly 220 (FIG. 5) into rotation. The armature 234 may be secured to the rotor assembly 230 in such a way that the rotation of the armature 234 may also rotate the entire rotor assembly 230. In some embodiments, the armature 234 may be secured to the central shaft 606 such that the rotation of the armature 234 is transmitted directly to the central shaft 606 and the central shaft transmits the rotation to the front connecting element 608 and other rotating elements. In some embodiments, the armature 234 may be secured to at least one of the front central spacer 310 and the rear central spacer 618 which may be connected to the corresponding front and/or rear magnetic bearing assembly 620, 622. The front and/or rear magnetic bearing assemblies 620, 622 may be connected to the respective front or rear retaining structure 304, 626. The front retaining structure 304 may be connected to at least one of the central shaft 606 and/or the front connecting element 608 and the rear retaining structure 626 may be connected to the central shaft 606. In such an embodiment, the armature 234 may transmit the rotation through the series of interconnected parts to the central shaft 606 and/or the front connecting element 608.

The rotor assembly 230 may include a complementary pull magnet 238 located behind (e.g., to the rear, following, etc.) the rear retaining structure 626. The complementary pull magnet 238 may be configured to interact with at least one corresponding pull magnet 228 (FIGS. 2 and 9) in the stator assembly 220 (FIG. 5) to maintain and/or correct an axial position of the rotor assembly 230 within the stator assembly 220 (FIG. 5). In some embodiments, the complementary pull magnet 238 may be secured to the central shaft 606. In some embodiments, the complementary pull magnet 238 may be secured to the rear retaining structure 626. In some embodiments, the complementary pull magnet 238 may be secured to the rotor assembly 230 by the shell 602.

In some embodiments, the rotor assembly 230 may be configured to be disassembled and reassembled with ease, such that individual components, such as the complementary permanent magnets 232, spacers 236, armature 234, complementary pull magnet 238, etc., may be removed and replaced when necessary. For example, the individual components may be replaced when the individual component is worn, broken, or otherwise defective. In some embodiments, the rotor assembly 230 may be configured to be replaced as a unit. For example, the rotor assembly 230 may be removed from the stator assembly 220 (FIG. 5) and a replacement rotor assembly 230 may be inserted in its place. In some embodiments, the rotor assembly 230 may be both replaceable as a unit and rebuildable.

Figure 7:
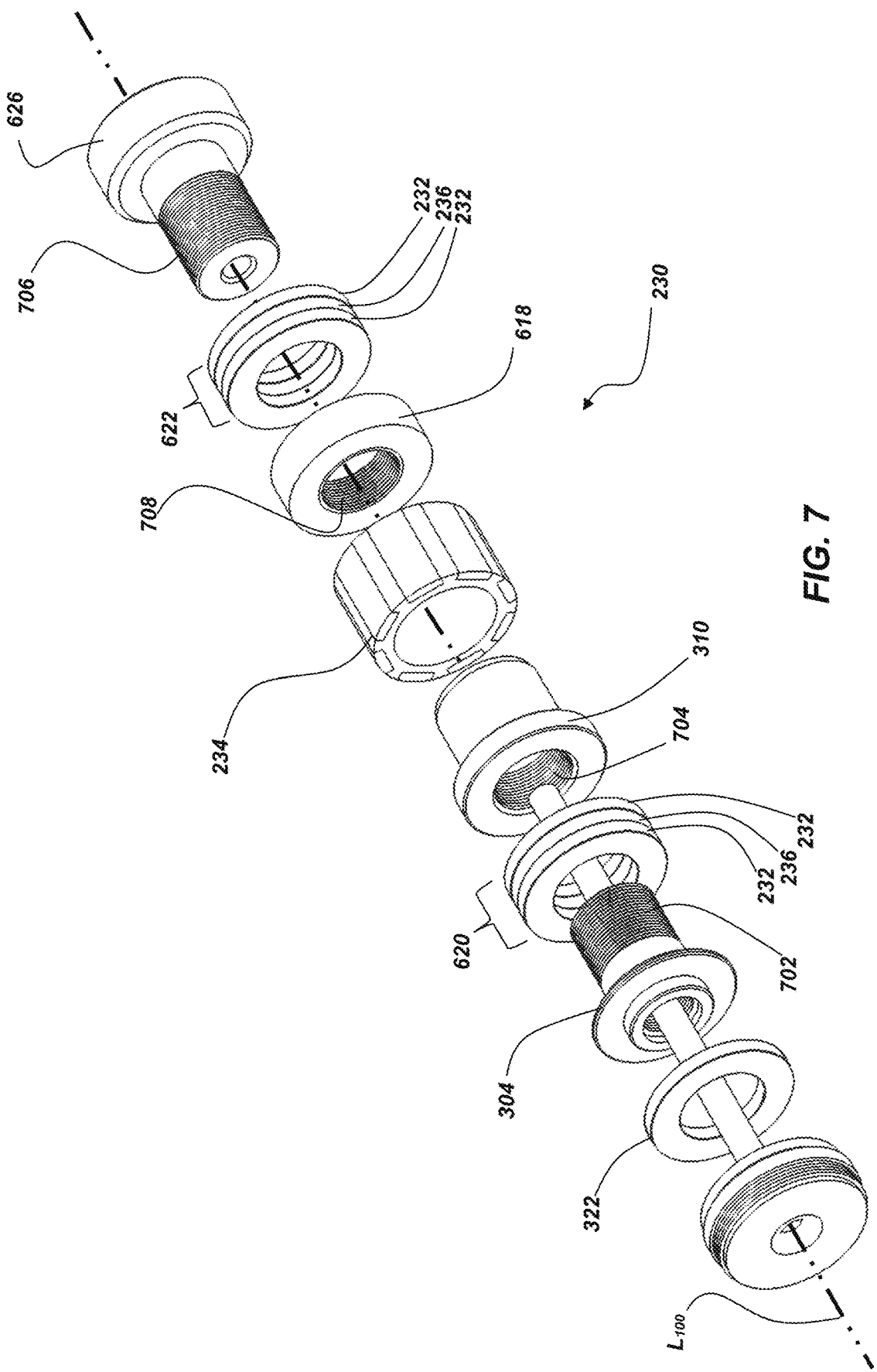
FIG. 7 is an exploded view of a portion of the rotor assembly illustrated in FIG. 6.

FIG. 7 illustrates an exploded view of a portion of the rotor assembly 230 illustrated in FIG. 6. The front retaining structure 304 may include an external interfacing structure 702 such as threads (e.g., pipe threads, machine threads, etc.), grooves, ridges, tabs, etc., configured to interface with a complementary internal interfacing structure 704 in the front central spacer 310. The complementary internal interfacing structure 704 may be configured to receive the external interfacing structure 702 of the front retaining structure 304 securing the front retaining structure 304 to the front central spacer 310.

The distance between the front retaining structure 304 and the front central spacer 310 may be defined by the interface between the external interfacing structure 702 and the complementary internal interfacing structure 704. In some embodiments, the distance between the front retaining structure 304 and the front central spacer 310 may be constant (e.g., the distance remains the same each time the rotor assembly 230 is assembled regardless of a size of the front magnetic bearing assembly 620). In some embodiments, the distance between the front retaining structure 304 and the front central spacer 310 may be adjustable. For example, a threaded interface between the external interfacing structure 702 and the complementary internal interfacing structure 704 may allow the distance between the front retaining structure 304 and the front central spacer 310 to change as the front retaining structure 304 is threaded into or out of the front central spacer 310.

The rear retaining structure 626 may also include an external interfacing component 706. In some embodiments, the rear central spacer 618 may include a complementary internal interfacing component 708 configured to interface with the external interfacing component 706. In some embodiments, the external interfacing component 706 may be configured to interface with the complementary internal interfacing structure 704 of the front central spacer 310.

The distance between the rear retaining structure 626 and the rear central spacer 618 may be defined by the interface between the external interfacing component 706 and the complementary internal interfacing component 708. In some embodiments, the distance between the rear retaining structure 626 and the rear central spacer 618 may be constant (e.g., the distance remains the same each time the rotor assembly 230 is assembled regardless of a size of the rear magnetic bearing assembly 622). In some embodiments, the distance between the rear retaining structure 626 and the rear central spacer 618 may be adjustable, such as with a threaded interface.

The distance between the rear retaining structure 626 and the front central spacer 310 may be defined by the interface between the external interfacing component 706 and the complementary internal interfacing structure 704. In some embodiments, the distance between the rear retaining structure 626 and the front central spacer 310 may be constant (e.g., the distance remains the same each time the rotor assembly 230 is assembled regardless of a size of the rear magnetic bearing assembly 622 combined with the rear central spacer 618 and the armature 234). In some embodiments, the distance between the rear retaining structure 626 and the front central spacer 310 may be adjustable, such as with a threaded interface.

In some embodiments, the interface between the external interfacing component 706 of the rear retaining structure 626 and the complementary internal interfacing component 708 of the rear central spacer 618 may be a floating connection. For example, the rear central spacer 618 may be slidably connected to the rear retaining structure 626 such that the rear central spacer 618 may move axially relative to the rear retaining structure 626. The distance between the rear retaining structure 626 and the rear central spacer 618 may be defined by intermediary components between the rear retaining structure 626 and the front central spacer 310, such as the armature 234 and/or the rear magnetic bearing assembly 622.

Figure 8:
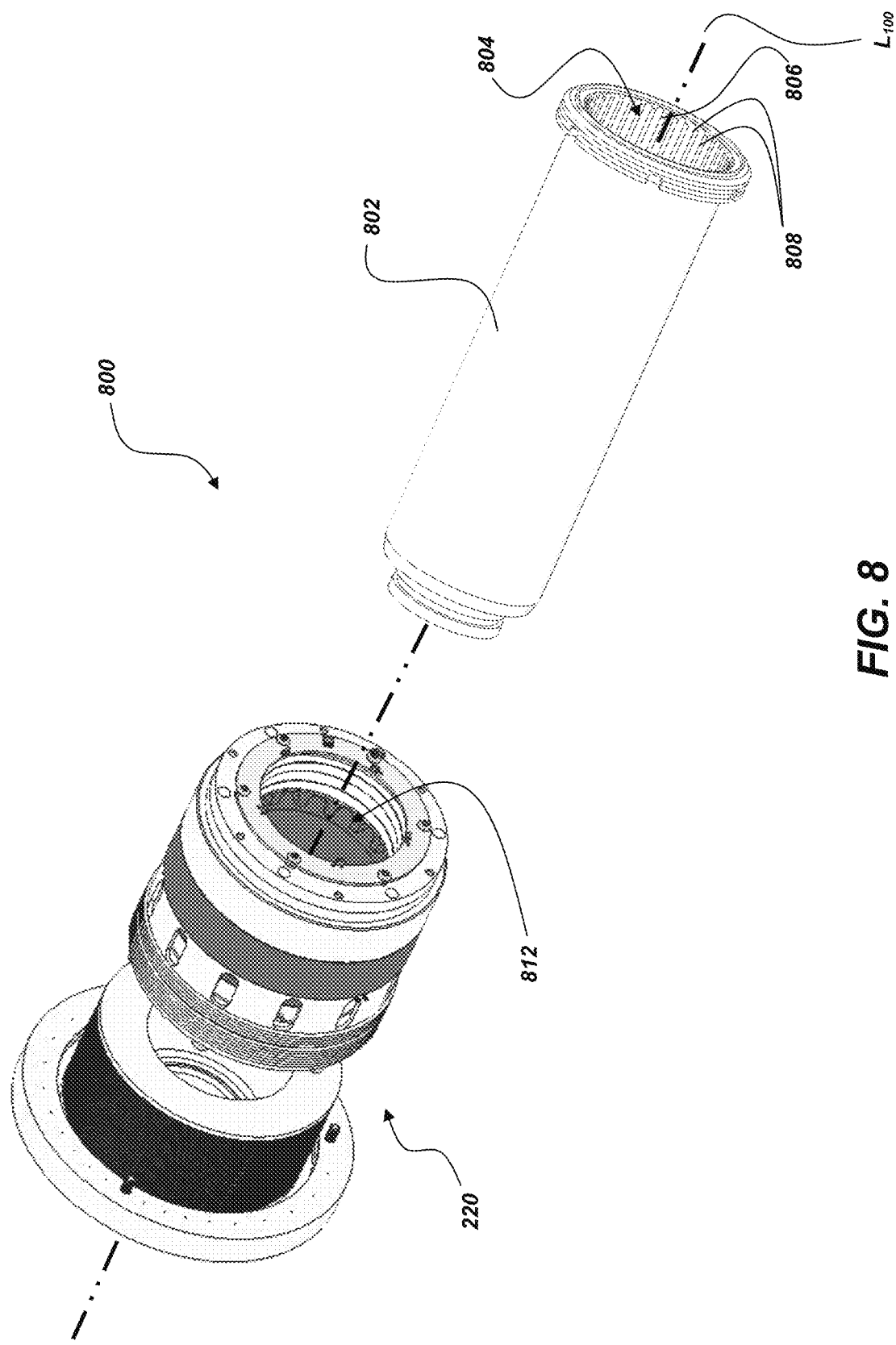
FIG. 8 is a partially exploded view of the stator assembly illustrated in FIG. 5.

FIG. 8 illustrates an exploded view of a stator assembly 800 and a stator sleeve 802 (e.g., housing, isolator, wall, etc.). The stator sleeve 802 is secured to the pump housing and configured to be disposed between the rotor assembly 230 (FIG. 5) and the stator assembly 800. The rotor assembly 230 (FIG. 5) may be inserted into a bore 804 of the stator sleeve 802. In some embodiments, the bore 804 may be sized to provide a clearance fit (e.g., slightly larger, a small percentage larger, etc.) to the rotor assembly 230 (FIG. 5). For example, the bore 804 may be sized such that an internal diameter of the bore 804 is between about 5 µm and about 5 mm larger than an external diameter of the rotor assembly 230 (FIG. 5) such as between about 2 mm and about 4 mm larger.

The stator sleeve 802 may include a pattern of raised or recessed features 808 (e.g., dimples, ridges, vanes, grooves, fins, etc.) on an interior surface 806 (e.g., surface facing the rotor assembly 230 (FIG. 5)) of the stator sleeve 802. The patterns on the interior surface 806 may at least partially (e.g., partially, substantially, completely, etc.) reduce rotational flow of fluid that may be present and/or flowing between the rotor assembly 230 (FIG. 5) and the interior surface 806 of the stator sleeve 802. Rotational flow of fluids in rotating assemblies may cause harmonic vibrations at certain rotational speeds (e.g., oil whirl, oil whip, fluid whip, etc.). Harmonic vibrations may be destructive if not corrected. The pattern of raised or recessed features may substantially reduce destructive vibrations introduced by the rotational flow.

The stator sleeve 802 may be at least partially disposed within the stator assembly 220. The stator sleeve 802 may be configured to isolate the stator assembly 220 from the rotor assembly 230 (FIG. 5). In some embodiments, the stator sleeve 802 may be configured to enable fluid to flow around the rotor assembly 230 (FIG. 5) while substantially preventing the fluid from contacting the stator assembly 220. In some embodiments, the stator sleeve 802 may be configured to shield the stator assembly 220 from contact or debris in the event that a failure occurs with the rotor assembly 230 (FIG. 5) (e.g., the rotor assembly 230 (FIG. 5) breaks, the rotor assembly 230 (FIG. 5) is improperly aligned, etc.). The stator sleeve 802 may be formed from a strong non-ferrous material such as, a polymer (e.g., polytetrafluoroethylene (PTFE), polyvinylchloride (PVC), etc.), a non-ferrous metal (e.g., aluminum, copper, etc.), etc. In some embodiments, the stator sleeve 802 may be formed from a corrosion resistant material (e.g., polymers, aluminum, etc.) or have a corrosion resistant coating (e.g., rubber coating, polymer coating, etc.).

The stator assembly 220 may be formed from an assembly of annular components defining an opening 812 configured to receive the stator sleeve 802. In some embodiments, the annular components of the stator assembly 220 may be mounted (e.g., secured, attached, etc.) to the stator sleeve 802. In some embodiments, the annular components of the stator assembly 220 may be mounted to an external body, housing, or casing (e.g., body 102 (FIG. 1)). In some embodiments, the annular components of the stator assembly 220 may be attached to the other annular components of the stator assembly 220. In some embodiments, the annular components of the stator assembly 220 may be attached to a combination of the elements described above.

Figure 9:
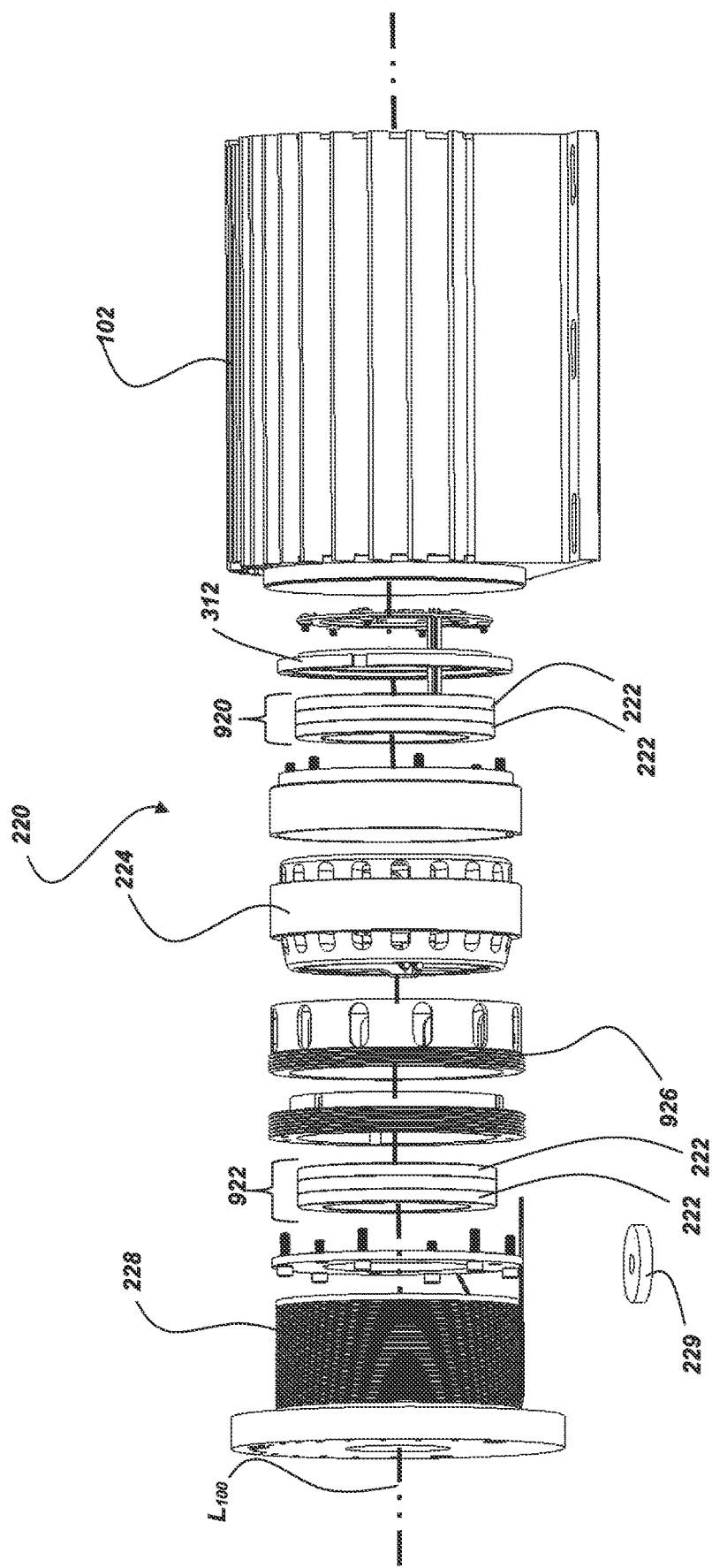
FIG. 9 is an exploded view of a portion of the stator assembly illustrated in FIG. 8.

FIG. 9 illustrates an exploded view of the stator assembly 220 of FIG. 8. The annular components of the stator assembly 220 may include a front magnetic bearing assembly 920, a rear magnetic bearing assembly 922, the drive magnets 224, a front retaining element 312, a rear retaining structure 926, and the pull magnet 228. The front magnetic bearing assembly 920 and the rear magnetic bearing assembly 922 may each include at least one permanent annular magnet 222. In some embodiments, the annular components may be positioned using spacers similar to those described above with respect to the rotor assembly 230 shown in FIGS. 6 and 7. In some embodiments, the spacers may be integrated into mounting structure such as the body 102 (FIG. 2).

Referring to FIGS. 6, 8, and 9. The front and rear magnetic bearing assemblies 920, 922 may be configured to interact with the front and rear magnetic bearing assemblies 620, 622 of the rotor assembly 230. For example, the front and rear magnetic bearing assemblies 920, 922 of the stator assembly 220 may be positioned (e.g., spaced) such that each permanent magnet 222 is aligned with the corresponding complementary permanent magnet 232 of the rotor assembly 230. In some embodiments, each permanent magnet 222 may be oriented such that the polarity (e.g., north pole, south pole) of the permanent magnet 222 is aligned with the polarity of the corresponding complementary permanent magnet 232 of the rotor assembly 230, such that a repelling force is induced by the magnetic field between the permanent magnet 222 and the corresponding complementary permanent magnet 232. In some embodiments, each permanent magnet 222 may be oriented such that the polarity of the permanent magnet 222 is opposite the polarity of the corresponding complementary permanent magnet 232 of the rotor assembly 230, such that an attracting force is induced by the magnetic field between the permanent magnet 222 and the corresponding complementary permanent magnet 232. In some embodiments, some of the permanent magnets 222 may be oriented with the polarities aligned with the corresponding complementary permanent magnets 232 of the rotor, while others may be oriented with the polarities opposite the corresponding complementary permanent magnets 232. For example, the permanent magnets 222 of the front magnetic bearing assembly 920 may be oriented with the polarities aligned with the corresponding complementary permanent magnets 232 of the front magnetic bearing assembly 620 of the rotor assembly 230 and the permanent magnets 222 of the rear magnetic bearing assembly 922 may be oriented with the polarities opposite the corresponding complementary permanent magnets 232 of the rear magnetic bearing assembly 622. In another example, each of the front and rear magnetic bearing assemblies 920, 922 may include at least one permanent magnet 222 oriented with the polarity aligned with the corresponding complementary permanent magnet 232 of the rotor assembly 230 and at least one permanent magnet 222 oriented with the polarity opposite the corresponding complementary permanent magnet 232 of the rotor assembly 230.

In some embodiments, adjacent permanent magnets 222 in one or more of the front magnetic bearing assembly 920 and the rear magnetic bearing assembly 922 may be oriented with the same polarities such that the adjacent permanent magnets 222 induce a repulsive force between the adjacent permanent magnets 222 in the stator assembly 220. In some embodiments, adjacent permanent magnets 222 in one or more of the front magnetic bearing assembly 920 and the rear magnetic bearing assembly 922 may be oriented with opposing polarities such that the adjacent permanent magnets 222 induce an attracting force between the adjacent permanent magnets 222 in the stator assembly 220.

The drive magnet assembly 224 may be substantially aligned with the armature 234 of the rotor assembly 230 and configured to interact with the armature 234. For example, an electrical current may be supplied to the drive magnets 224. The drive magnets 224 may generate a magnetic field from the electrical current which may induce a rotational force on the armature 234. The electrical current may originate from an external source (e.g., generator, line power, transformer, inverter, motor controller, variable frequency drive, etc.). In some embodiments, internal circuitry (e.g., control board, motor controller, speed controller, etc.) may modify the electrical current. In some embodiments, the pump may include the controller 260 that may divert some of the electrical current to power and operate the controller 260 and/or other components of the pump. In some embodiments, the controller 260 and other components such as the complementary pull magnet 228 may be powered separately from the pump, such as through an independent power supply. The controller 260 may modify the electrical current (e.g., change amplitude, frequency, voltage, amps, etc.) before sending the electrical current to the drive magnets 224. In some embodiments, the controller 260 may monitor the electrical current being supplied to the drive magnet 224. In some embodiments, the controller 260 may control other components of the pump based on the current being supplied to the drive magnet 224. For example, the controller 260 may monitor the amps being supplied to the drive magnet 224 and may control the current being supplied to the pull magnet 228 based on the amps being supplied to the drive magnet 224.

Figure 10:
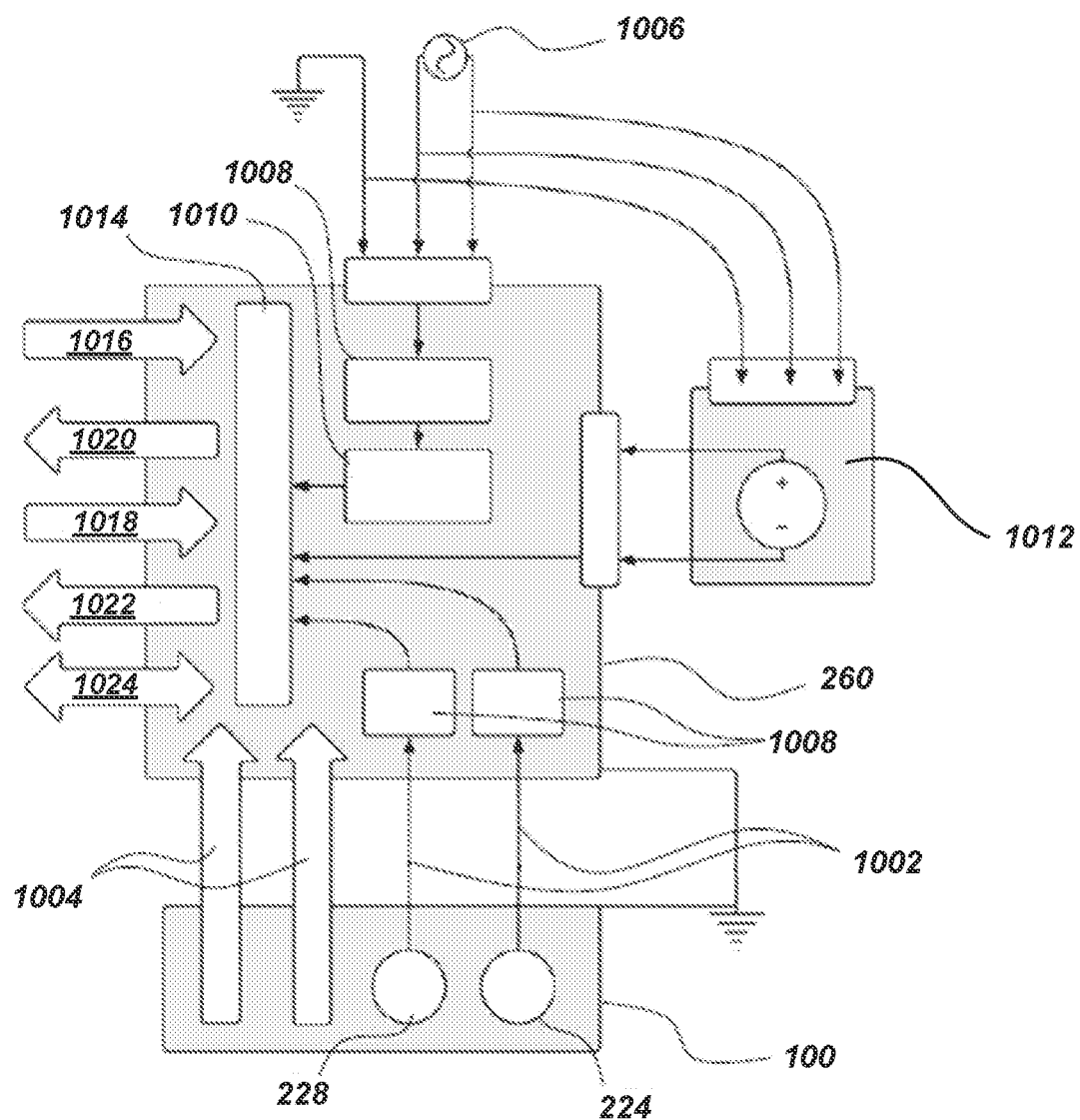
FIG. 10 is a schematic view of a control system according to an embodiment of the present disclosure.

FIG. 10 illustrates a schematic view of a control system for the pump 100. The control system may include the controller 260. In some embodiments, the controller 260 may be integrated with the pump 100. In some embodiments, the controller 260 may be external to the pump 100. For example, the controller 260 may be coupled to the pump 100 through the electrical cables 1002 and/or signal wires 1004 passing into the pump 100 through the ports 106 (FIG. 1). For example, the electrical cables 1002 may provide power to one or more of the drive magnet 224 and/or the pull magnet 228.

The controller 260 may control the power passing to the drive magnet 224 and/or the pull magnet 228. For example, line voltage power 1006, such as 110 Volts Alternating Current (VAC), 120 VAC, 208 VAC, 240 VAC, 277 VAC, 480 VAC, etc., may pass through the controller 260. In some embodiments, the line voltage power 1006 may be single phase power, dual phase power, or three phase power. The controller 260 may be configured to process the line voltage power 1006. For example, the controller 260 may include a filter 1008. The filter 1008 may be configured to filter noise out of the line voltage power 1006, such as power spikes. In some embodiments, the filter 1008 may be configured to detect problems in the line voltage power 1006, such as brown outs, loss of a phase, power spikes, etc. In some embodiments, the filter 1008 may be configured to interrupt power if a problem is detected such that internal components of the controller 260 and/or the pump 100 may be protected from the line voltage power 1006. In some embodiments, the controller 260 may include a power converting device 1010. For example, the power converting device 1010 may be configured to convert alternating current power to direct current power (e.g., rectifier) or direct current power to alternating current power (e.g., inverter). In some embodiments, the power converting device 1010 may be configured to change a voltage and/or amperage of the line voltage power 1006 (e.g., transformer).

In some embodiments, the controller 260 may include one or more drives configured to control the power passing through the controller 260 to the drive magnet 224 and/or the pull magnet 228 with one or more drives 1012. For example, the controller 260 may include variable frequency drives (VFDs) configured to adjust a frequency of the power passing to the drive magnet 224 and/or the pull magnet 228. Adjusting the frequency may enable the controller 260 to control a speed of the armature and/or a magnetic field generated by the pull magnet 228. In some embodiments, the drives 1012 may control the power to the drive magnet 224 and/or the pull magnet 228 by selectively switching the power from the controller 260 on and off, thus reducing the power being supply from the controller 260.

In some embodiments, the controller 260 may only control power to one of the drive magnet 224 and/or the pull magnet 228. For example, the controller 260 may be configured to control the axial position of the rotor assembly 230 by controlling power to the pull magnet 228 independent of the power being supplied to the drive magnet 224. The controller 260 may monitor the axial position of the rotor assembly 230 through the position sensor 320 and control the power to the pull magnet 228 accordingly. The power to the drive magnet 224 may be controlled and monitored independently, such that the speed, pressure, and/or flow of the pump may be controlled independent of the axial position of the rotor assembly 230.

The controller 260 may include a user interface 1014. In some embodiments, the user interface 1014 may be a display, such as a touch screen, monitor, screen, etc. In some embodiments, the user interface 1014 may be a communication module configured to communicate with a remote computing device, such as a control system, building management system (BMS), personal computer, laptop, server, cloud, etc.

The controller 260 may be configured to receive analog inputs 1016 and/or digital inputs 1018. For example, the controller 260 may be configure to receive analog inputs 1016 such as, set points, process feedback, system requirements, system sensor readings, etc. The digital inputs 1018 may include a system enable, pump enable, reset, control enable, alarm, system safety (e.g., high pressure, high temperature, low temperature, low pressure, manual kill switch, etc.), etc. In some embodiments, the analog inputs may be signals such as voltage signals (e.g., 0-5 VDC, 0-10 VDC, etc.), resistance signals (e.g., resistance temperature detectors (RTD), etc.), or current signals (e.g., 0-20 milliamp (mA), 4-20 mA, etc.).

The controller 260 may be configured to provide analog outputs 1020 and/or digital outputs 1022 to other components and/or to a user. For example, the controller 260 may provide analog outputs 1020 and/or digital outputs 1022 may be provided to the user through the display device such as through a graphic user interface (GUI), a spread sheet, a series of lights, etc. The analog outputs 1020 and/or digital outputs 1022 may be provided to other components through signals such as voltage signals (e.g., 0-10 VDC, 0-5 VDC, 10-30 VDC, etc.) or current signals (e.g., 4-20 mA, 0-20 mA, etc.). In some embodiments, the analog outputs 1020 may include motor speed, rotor position, set points, etc. The digital outputs 1022 may include motor status, errors, alarms, etc. In some embodiments, the controller 260 may receive motor information such as, sensor readings (e.g., motor temperature, rotor position, motor speed, etc.) from sensors within the pump 100. For example, the position sensor 320 (FIG. 3) may be provide the rotor position to the controller 260 directly through the signal wires 1004 or through a communication interface in the controller 260.

The controller 260 may also include a network connection 1024. The network connection 1024 may be configured to connect the controller 260 and/or the user interface 1014 to additional controllers and/or system devices, such as redundant pumps, complementary devices, control devices, etc. For example, the pump 100 may be controlled through a system level control system, such as a BMS system, plant control system, process control system, etc. The controller 260 may be configured to communicate information from the pump 100 and/or controller 260 to the system through the network connection 1024. In some embodiments, the network connection may be a communication cable connection, such as RS 232 (e.g., serial), RS 485, RJ45 (e.g., Ethernet), RJ11, RJ14, RJ25, etc.

In some embodiments, the controller 260 may monitor additional features in the motor. The controller 260 may use sensors, such as temperature sensors (e.g., resistance temperature detectors (RTD), negative temperature coefficient (NTC), thermocouple, etc.), position sensors (e.g., hall-effect, proximity, induction, etc.), current sensors (e.g., transducer, hall-effect, etc.), etc. The controller 260 may relay the sensor readings to an external source (e.g., monitoring system, display, alarming system, control system, etc.). In some embodiments, the controller 260 may perform operations, such as change pump speed, change operation and/or parameters of other components (e.g., pull magnet 228, etc.), produce an alarm, stop the pump, etc., based on readings.

While bearingless pumps may experience higher efficiencies due to friction reduction, that friction reduction may not result in reduced wear. For example, bearingless pumps may allow for increased axial movement of the rotor which may result in harmful vibrations. Additionally, the higher rotational speeds that are achievable with reduced friction may introduce additional harmful vibrations. Embodiments of the present disclosure may control (e.g., reduce, substantially reduce, eliminate, etc.) the harmful vibrations inherent in bearingless pumps. Reducing the harmful vibrations may result in increased operational lifespans, decreased downtime for repairs, and decreased operational and repair expenses. Some embodiments of the present disclosure may also reduce the amount of downtime experienced when a pump fails or needs to be rebuilt or repaired.

In some environments, pumps are used in critical systems where having a pump down due to a failure could result in catastrophic failure of a system. In other systems, having a pump down due to failure may result in large financial losses. Increasing the operational lifespan of a pump and/or reducing the amount of downtime when repairs are needed may result in a reduction of financial burdens on operations utilizing pumps, because in critical systems redundancies may be reduced and in high value systems financial losses may be reduced and/or avoided.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated by the inventors.

What is claimed is:

1. A pump, comprising:
    a stator comprising a drive magnet, one or more permanent magnets positioned on opposing axial sides of the drive magnet, and at least one axial positioning magnet positioned at a first axial end of the stator, such that at least one of the one or more permanent magnets are positioned between the at least one axial positioning magnet and the drive magnet;
    a rotor disposed coaxially within the stator, the rotor comprising an armature aligned with the drive magnet, one or more complementary permanent magnets on opposing axial sides of the armature aligned with the one or more permanent magnets, and a push/pull magnet positioned at a first axial end of the rotor, such that at least one of the one or more complementary permanent magnets are positioned between the push/pull magnet and the armature, the push/pull magnet axially offset from the at least one axial positioning magnet;
    wherein the one or more complementary permanent magnets of the rotor and the one or more permanent magnets of the stator are configured to create one or more magnetic bearings, the push/pull magnet is configured to interact with the at least one axial positioning magnet to position the rotor in an axial direction relative to the stator, and the armature and the drive magnet are configured to rotate the rotor with respect to the stator; and
    an impeller coupled to the rotor at a second axial end of the rotor opposite the first axial end and configured to rotate with the rotor.

2. The pump of claim 1, further comprising an electronic controller.

3. The pump of claim 2, wherein the electronic controller monitors an electrical current used by the at least one axial positioning magnet.

4. The pump of claim 3, wherein the electronic controller changes control parameters to maintain the electrical current to the at least one axial positioning magnet within a range of 12 amps or less.

5. The pump of claim 4, wherein the electronic controller adjusts power to the at least one axial position magnet to maintain an axial position of the rotor relative to the stator.

6. The pump of claim 1, further comprising a fluid pathway between the rotor and the stator.

7. The pump of claim 6, further comprising a housing positioned between the rotor and the stator isolating the rotor from the stator and defining the fluid pathway between the housing and the rotor.

8. The pump of claim 7, wherein the housing comprises a pattern of raised or recessed features on a face of the housing facing the rotor and in contact with the fluid.

9. The pump of claim 1, further comprising a lift magnet positioned on a radial side of the stator, wherein the lift magnet is configured to induce a load on the rotor that changes as a radial distance between the rotor and the lift magnet changes.

10. The pump of claim 9, wherein the lift magnet is a permanent magnet.

11. A pump assembly comprising:
an electric motor comprising:
a rotor configured to rotate relative to a stator, wherein a drive magnet in the stator is configured to impart a rotational force on a permanent magnet in the rotor;
at least two magnetic bearings positioned on opposing axial ends of the drive magnet in the stator comprising at least two complementary permanent magnets, the at least two complementary permanent magnets comprising rotating permanent magnets and stationary permanent magnets, wherein the rotating permanent magnets are carried on opposing axial ends of the rotor and the stationary permanent magnets are attached to the stator on opposing axial ends of the drive magnet; and
a positioning magnet assembly in a first axial end of the electric motor comprising an electromagnetic axial positioning magnet coupled to the stator and a permanent push/pull magnet coupled to the rotor and axially offset from the electromagnetic axial positioning magnet, wherein the electromagnetic axial positioning magnet is configured to interact with the permanent push/pull magnet to generate a force on the rotor in a direction along a longitudinal axis of the electric motor; and
a fluid pathway through the rotor configured to transfer fluid from a first axial end of the rotor to a second axial end of the rotor; and
an impeller coupled to the rotor on an axial end of the rotor opposite the first axial end of the electric motor.

12. The pump of claim 11, further comprising a fluid passage defined between the rotor and the stator configured to transfer fluid from a second axial end of the stator adjacent the second axial end of the rotor to a first axial end of the stator adjacent the first axial end of the rotor.

13. The pump of claim 11, further comprising a stator sleeve positioned between the stator and the rotor.

14. The pump of claim 13, wherein an inner surface of the stator sleeve faces the rotor and comprises a surface with a pattern of raised or recessed features.

15. The pump of claim 11, further comprising at least one position sensor positioned in the stator substantially aligned with at least one of the rotating permanent magnets of the rotor.

16. The pump of claim 15, wherein the position sensor is chosen from a magnetic proximity sensor, a hall sensor, an ultrasonic sensor, an inductive sensor, a laser sensor, a photo sensor, a capacitive sensor, and an infrared sensor.

* * * * *